US012120463B2

(12) United States Patent
Verghese et al.

(10) Patent No.: US 12,120,463 B2
(45) Date of Patent: *Oct. 15, 2024

(54) ADJUSTING VEHICLE SENSOR FIELD OF VIEW VOLUME

(71) Applicant: Waymo LLC, Mountain View, CA (US)

(72) Inventors: Simon Verghese, Mountain View, CA (US); Alexander McCauley, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,478

(22) Filed: Apr. 24, 2023

(65) Prior Publication Data
US 2023/0262202 A1    Aug. 17, 2023

Related U.S. Application Data

(63) Continuation of application No. 17/126,231, filed on Dec. 18, 2020, now Pat. No. 11,671,564.
(Continued)

(51) Int. Cl.
*H04N 7/18*    (2006.01)
*B60W 30/095*    (2012.01)
(Continued)

(52) U.S. Cl.
CPC .......... *H04N 7/18* (2013.01); *B60W 30/0956* (2013.01); *B60W 60/001* (2020.02); *G01S 7/483* (2013.01);
(Continued)

(58) Field of Classification Search
CPC .... H04N 5/23296; H04N 7/18; G01S 17/931; G01S 17/86; G01S 7/483; G01S 7/497;
(Continued)

(56) References Cited

U.S. PATENT DOCUMENTS 6,587,074 B1    7/2003  Winter et al.
10,589,723 B1*  3/2020  Dubey ................... G01S 7/497
(Continued)

FOREIGN PATENT DOCUMENTS

JP    2006275942 A    10/2006
JP    2014-052347 A    3/2014
(Continued)

OTHER PUBLICATIONS

International Search Report and Written Opinion for PCT/US2020/065952, dated Apr. 9, 2021.

*Primary Examiner* — Christopher S Kelley
*Assistant Examiner* — Asmamaw G Tarko
(74) *Attorney, Agent, or Firm* — McDonnell Boehnen Hulbert & Berghoff LLP

(57) ABSTRACT

An example method includes receiving, from one or more sensors associated with an autonomous vehicle, sensor data associated with a target object in an environment of the vehicle during a first environmental condition, where at least one sensor of the sensor(s) is configurable to be associated with one of a plurality of operating field of view volumes. The method also includes based on the sensor data, determining at least one parameter associated with the target object. The method also includes determining a degradation in the parameter(s) between the sensor data and past sensor data, where the past sensor data is associated with the target object in the environment during a second environmental condition different from the first and, based on the degradation, adjusting the operating field of view volume of the at least one sensor to a different one of the operating field of view volumes.

20 Claims, 9 Drawing Sheets

Related U.S. Application Data

(60) Provisional application No. 62/952,879, filed on Dec. 23, 2019.

(51) Int. Cl.
| | |
|---|---|
| *B60W 60/00* | (2020.01) |
| *G01S 7/483* | (2006.01) |
| *G01S 7/497* | (2006.01) |
| *G01S 17/86* | (2020.01) |
| *G01S 17/89* | (2020.01) |
| *G01S 17/931* | (2020.01) |
| *G01W 1/06* | (2006.01) |
| *G05D 1/00* | (2024.01) |
| *G06V 10/44* | (2022.01) |
| *G06V 10/88* | (2022.01) |
| *G06V 20/56* | (2022.01) |
| *G08G 1/01* | (2006.01) |
| *G08G 1/04* | (2006.01) |
| *G08G 1/048* | (2006.01) |
| *H04N 23/69* | (2023.01) |

(52) U.S. Cl.
CPC .............. *G01S 7/497* (2013.01); *G01S 17/86* (2020.01); *G01S 17/89* (2013.01); *G01S 17/931* (2020.01); *G01W 1/06* (2013.01); *G05D 1/0088* (2013.01); *G06V 10/44* (2022.01); *G06V 10/89* (2022.01); *G06V 20/56* (2022.01); *G08G 1/0112* (2013.01); *G08G 1/0116* (2013.01); *G08G 1/04* (2013.01); *G08G 1/048* (2013.01); *H04N 23/69* (2023.01); *B60W 2420/403* (2013.01); *B60W 2420/408* (2024.01); *B60W 2556/45* (2020.02); *G05D 1/0251* (2013.01); *G05D 1/0257* (2013.01)

(58) Field of Classification Search
CPC ...... G01S 17/89; G01S 13/865; G01S 13/867; G01S 13/931; B60W 60/001; B60W 2556/45; B60W 2420/42; B60W 2420/52; B60W 30/0956; G06V 10/44; G06V 10/507; G06V 20/56; G06V 10/89; G01W 1/06; G05D 1/0088; G05D 1/0251; G05D 1/0257; G05D 2201/0213; G08G 1/0112; G08G 1/0116; G08G 1/04; G08G 1/048
USPC ........................................... 348/148
See application file for complete search history.

(56) References Cited

U.S. PATENT DOCUMENTS

| | | |
|---|---|---|
| 11,671,564 B2 | 6/2023 | Verghese et al. |
| 2012/0133738 A1 | 5/2012 | Hoffmeier et al. |
| 2012/0310466 A1* | 12/2012 | Fairfield .............. G05D 1/0255 701/28 |
| 2013/0069773 A1 | 3/2013 | Li et al. |
| 2014/0214255 A1* | 7/2014 | Dolgov ................ G05D 1/0274 701/23 |
| 2016/0350601 A1 | 12/2016 | Grauer et al. |
| 2016/0357187 A1* | 12/2016 | Ansari ................. G06T 19/003 |
| 2017/0328729 A1 | 11/2017 | Zhu et al. |
| 2018/0032085 A1* | 2/2018 | Dolgov ................ G05D 1/0276 |
| 2018/0178797 A1 | 6/2018 | Seaman et al. |
| 2018/0180440 A1 | 6/2018 | Masuda et al. |
| 2019/0011917 A1 | 1/2019 | Kuffner |
| 2019/0088148 A1 | 3/2019 | Jacobus et al. |
| 2019/0146511 A1* | 5/2019 | Hurd ..................... G06F 18/251 701/27 |
| 2019/0156134 A1* | 5/2019 | Krishnan ................. G06N 5/04 |
| 2019/0196481 A1* | 6/2019 | Tay ...................... G05D 1/0246 |
| 2019/0219697 A1* | 7/2019 | Castorena Martinez .................... G01S 17/86 |
| 2019/0277962 A1 | 9/2019 | Ingram et al. |
| 2019/0377814 A1 | 12/2019 | Shtrom et al. |
| 2020/0064483 A1 | 2/2020 | Li et al. |
| 2020/0086871 A1* | 3/2020 | Gotoda ................ G05D 1/0088 |
| 2020/0088857 A1* | 3/2020 | Goldberg ............ G01D 11/245 |
| 2020/0166636 A1 | 5/2020 | Mihajlovic et al. |
| 2021/0125010 A1* | 4/2021 | Kim ..................... G06V 10/147 |
| 2021/0195112 A1 | 6/2021 | Verghese et al. |
| 2022/0128670 A1* | 4/2022 | Trierweiler ........... G01S 7/4813 |

FOREIGN PATENT DOCUMENTS

| | | |
|---|---|---|
| JP | 2016-058912 A | 4/2016 |
| JP | 2018109535 A | 7/2018 |
| JP | 2019-102929 A | 6/2019 |
| WO | 2018212346 A1 | 11/2018 |

* cited by examiner

ADJUSTING VEHICLE SENSOR FIELD OF VIEW VOLUME

CROSS-REFERENCE TO RELATED APPLICATIONS

This application is a continuation of U.S. patent application Ser. No. 17/126,231, filed on Dec. 18, 2020, which claims priority to U.S. Provisional Application No. 62/952,879, filed on Dec. 23, 2019. The present disclosure is also related to U.S. patent application Ser. No. 17/002,092, filed on Aug. 25, 2020, which claims priority to U.S. Provisional Application No. 62/952,879. The entire contents of U.S. patent application Ser. No. 17/126,231, U.S. patent application Ser. No. 17/002,092, and U.S. Provisional Application No. 62/952,879, are incorporated herein by reference.

BACKGROUND

Vehicles can be configured to operate in an autonomous mode in which the vehicle navigates through an environment with little or no input from a driver. Such autonomous vehicles can include one or more systems (e.g., sensors and associated computing devices) that are configured to detect information about the environment in which the vehicle operates. The vehicle and its associated computer-implemented controller use the detected information to navigate through the environment. For example, if the system(s) detect that the vehicle is approaching an obstacle, as determined by the computer-implemented controller, the controller adjusts the vehicle's directional controls to cause the vehicle to navigate around the obstacle.

For example, an autonomous vehicle may include lasers, sonar, radar, cameras, thermal imagers, and other sensors which scan and/or record data about the surroundings of the vehicle. Sensor data from one or more of these devices may be used to detect objects and their respective characteristics (position, shape, heading, speed, etc.). This detection and identification is useful for the operation of autonomous vehicles.

SUMMARY

In one example, the present disclosure provides a method. The method includes receiving, from one or more sensors associated with an autonomous vehicle, sensor data associated with a target object in an environment of the autonomous vehicle during a first environmental condition, where at least one sensor of the one or more sensors is configurable to be associated with one of a plurality of operating field of view volumes, and wherein each operating field of view volume represents a space within which the at least one sensor is expected to detect objects outside the autonomous vehicle at a minimum confidence level. The method also includes based on the sensor data, determining at least one parameter associated with the target object. The method also includes determining a degradation in the at least one parameter between the sensor data and past sensor data, where the past sensor data is associated with the target object in the environment during a second environmental condition different from the first environmental condition. The method also includes based on the determined degradation in the at least one parameter, adjusting the operating field of view volume of the at least one sensor to a different one of the plurality of operating field of view volumes.

In another example, the present disclosure provides a system for controlling operation of an autonomous vehicle. The system includes one or more sensors, where at least one sensor of the one or more sensors is configurable to be associated with one of a plurality of operating field of view volumes, and wherein each operating field of view volume represents a space within which the at least one sensor is expected to detect objects outside the autonomous vehicle at a minimum confidence level. The system also includes one or more processors coupled to the one or more sensors. The system also includes a memory coupled to the one or more processors and having stored thereon instructions that, upon execution by the one or more processors, cause the one or more processors to perform operations. The operations include receiving, from the one or more sensors, sensor data associated with a target object in an environment of the autonomous vehicle during a first environmental condition. The operations also include based on the sensor data, determining at least one parameter associated with the target object. The operations also include determining a degradation in the at least one parameter between the sensor data and past sensor data, wherein the past sensor data is associated with the target object in the environment during a second environmental condition different from the first environmental condition. The operations also include based on the determined degradation in the at least one parameter, adjusting the operating field of view volume of the at least one sensor to a different one of the plurality of operating field of view volumes.

In another example, the present disclosure provides a non-transitory computer-readable storage medium, having stored thereon program instructions that, upon execution by one or more processors, cause the one or more processors to perform operations. The operations include receiving, from one or more sensors associated with an autonomous vehicle, sensor data associated with a target object in an environment of the autonomous vehicle during a first environmental condition, where at least one sensor of the one or more sensors is configurable to be associated with one of a plurality of operating field of view volumes, and wherein each operating field of view volume represents a space within which the at least one sensor is expected to detect objects outside the autonomous vehicle at a minimum confidence level. The operations also include based on the sensor data, determining at least one parameter associated with the target object. The operations also include determining a degradation in the at least one parameter between the sensor data and past sensor data, where the past sensor data is associated with the target object in the environment during a second environmental condition different from the first environmental condition. The operations also include based on the determined degradation in the at least one parameter, adjusting the operating field of view volume of the at least one sensor to a different one of the plurality of operating field of view volumes.

These as well as other aspects, advantages, and alternatives, will become apparent to those of ordinary skill in the art by reading the following detailed description, with reference where appropriate to the accompanying drawings.

DETAILED DESCRIPTION

Figure 1:
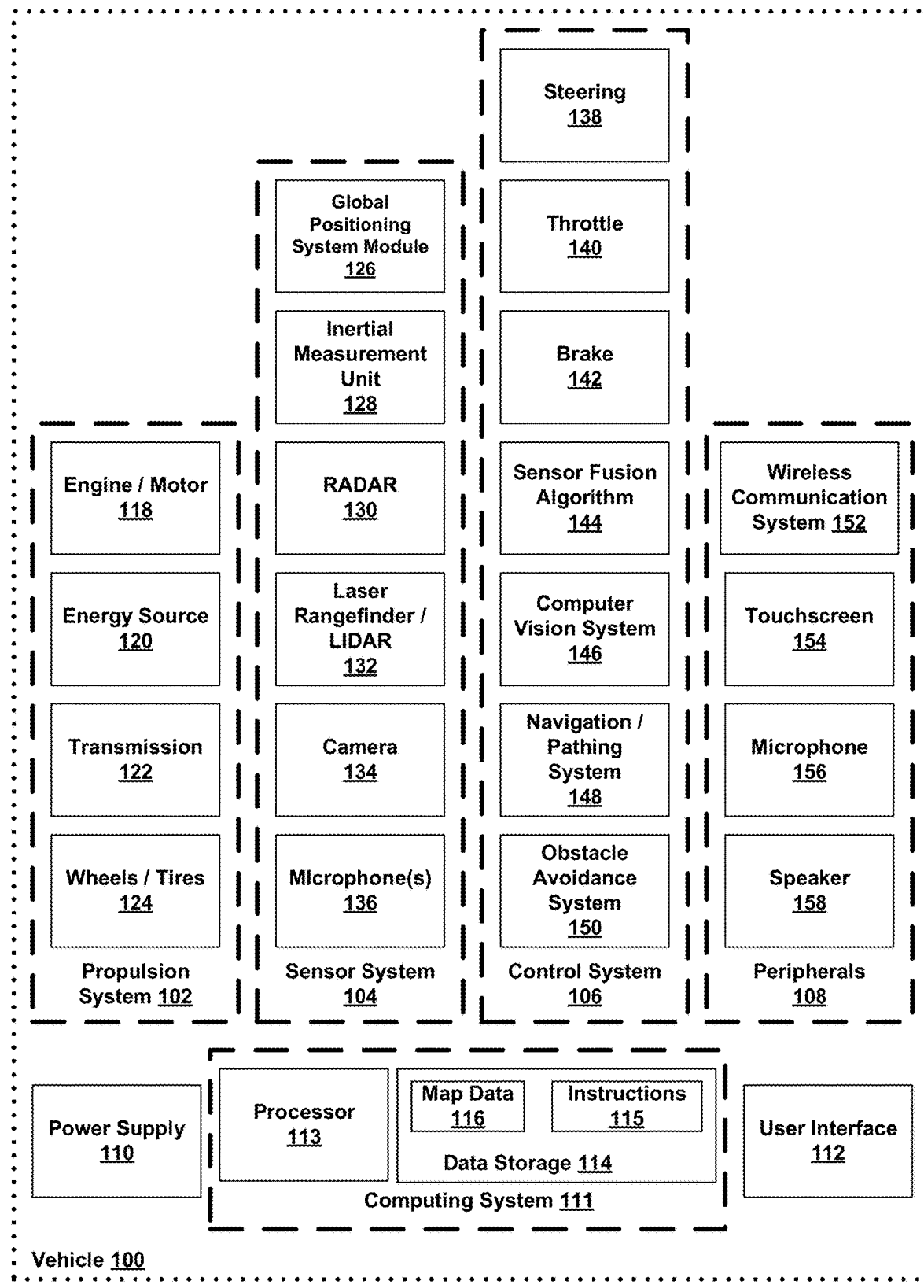
FIG. 1 is a functional block diagram depicting aspects of an example autonomous vehicle.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Many vehicles include various sensing systems to aid in the navigation and control of the vehicle. Some vehicles may operate in a fully autonomous mode, where no human interaction is used for operations, a semi-autonomous mode, where little human interaction is used for operations, or a human-operated mode, where a human operates the vehicle and sensors may aid the human. The sensors may be used to provide information about the region around the vehicle. This information may be used to identify features of the roadway and other objects (such as other vehicles, pedestrians, etc.) near the vehicle.

The sensor systems of a vehicle may include, for example, a light detection and ranging (lidar) system and a radar system. lidar uses laser pulses to measure the distance to and speed of objects that reflect the laser light. Radar uses radio waves to measure the distance to and speed of objects that reflect the radio waves. The data from the lidar and radar systems may be used, possibly along with data from other sensors of the vehicle's sensor system, such as cameras, to determine where objects are located in an environment around the vehicle. A particular lidar sensor, radar sensor, and/or camera may each have a field of view. The field of view of a sensor may include one or more angular regions over which the sensor may detect objects and an associated range that corresponds to a maximum distance from the sensor at which the sensor may reliably detect objects in that field of view. In some instances, the associated range may vary for various azimuth/elevation angles within the field of view. Together, the values of the parameters that define this field of view, e.g., values for range, azimuth, and elevation, form a volume that can be referred to as the field of view volume or operating field of view volume.

The operating field of view volume of a particular sensor can be considered an accurate representation of a space within which the particular sensor can be expected to detect objects outside the autonomous vehicle at a minimum confidence level (e.g., a confidence level indicating high confidence). In other words, one or more processors of the vehicle system (e.g., a chip that controls operation of the sensor, or a processor of the vehicle's control system) can be configured to confidently rely on sensor data acquired within the space defined by the sensor's operating field of view volume. For example, a processor associated with the particular sensor can be configured to associate a higher confidence level (e.g., higher than a predefined confidence threshold level) to objects or other information detected at a range, azimuth, and/or elevation within that sensor's operating field of view volume, and can be configured to associate a lower confidence level (e.g., equal to or lower than the predefined confidence threshold level) to objects or other information detected at a range, azimuth, and/or elevation outside of that operating field of view volume.

A vehicle can be exposed to varying conditions while in operation, such as changes in weather (e.g., fog, rain, snow), changes in the time-of-day, changes in speed limit, changes in terrain or other geographical conditions, changes in settlement (e.g., urban, suburban, rural), changes in the number of other vehicles or objects in close proximity to the vehicle, other changes external to the vehicle, and/or internal changes to the vehicle's systems (e.g., sensor errors, sensor surface cleanliness, vehicle subsystem faults, etc.). At any given point in time, one or more of these or other conditions can be present in the vehicle's operating environment. In the context of the present disclosure, an "operating environment" of a vehicle can be or include one or more conditions internal and/or external to the vehicle that can change over time, including but not limited to the conditions described above and other conditions described elsewhere in this disclosure. Thus, when one or more of such conditions change, the operating environment of the vehicle can change.

In some embodiments, the operating field of view volume for at least one of the vehicle's sensors can be adjusted based on an operational design domain (ODD) for the vehicle. An ODD is defined by or includes the conditions under which a given vehicle or other driving automation system or feature thereof is specifically designed to operate, including, but not limited to, environmental, geographical, and time-of-day restrictions, and/or the requisite presence or absence of certain traffic or roadway characteristics. A vehicle can have multiple ODDs, each of which can include at least one of an environmental condition, a geographical condition, a time-of-day condition, a traffic condition, or a roadway condition. The vehicle system might at one point in time associate the vehicle with a first ODD, thus causing the vehicle system to operate in a particular way that corresponds with the first ODD. At a later time, the vehicle system might detect a change in an operating environment of the vehicle, in which case the vehicle system might responsively associate the vehicle with a second, different ODD, thus causing the vehicle system to operate in a different way that corresponds with the second ODD.

A particular sensor can be configurable to be associated with one of a plurality of operating field of view volumes. The plurality of operating field of view volumes can be unique to the particular sensor, or can be associated with a plurality of sensors of the same type (e.g., lidar, camera, or radar).

In some examples, the plurality of operating field of view volumes can be a finite/predetermined number of operating field of view volumes, each of which can be mapped in the vehicle system's memory (e.g., in a table) to a corresponding operating environment and/or ODD. Additionally or alternatively, any one or more of the plurality of operating field of view volumes for a particular sensor or plurality of sensors can be determined in real time in response to a trigger condition (e.g., a change in operating environment). Additionally or alternatively, any predetermined operating field of view volumes associated with a particular sensor or plurality of sensors can be compared with newly-acquired sensor data to determine whether the predetermined operating field of view volumes still accurately represent the degree to which the sensor(s) should be relied upon for a particular operating environment.

Some example methods and systems for adjusting the operating field of view volume of a sensor based on the operating environment of the autonomous vehicle (e.g., based on the vehicle system detecting the operating environment or detecting a change of one operating environment to another), as well as some example methods and systems for associating the vehicle with a particular ODD based on the operating environment of the autonomous vehicle, are described in U.S. patent application Ser. No. 17/002,092, the entirety of which is hereby incorporated by reference herein.

The present disclosure provides systems and methods for adjusting the operating field of view volume of one or more of the vehicle's sensors using parameters that are associated with recognizable target objects in the vehicle's environment and that can be determined from sensor data associated with the target objects. In particular, a change from a first environmental condition (e.g., clear weather) to a second environmental condition (e.g., foggy or snowy weather) can cause at least one of such parameters to degrade. The disclosed systems and methods thus use the degradation of the parameter(s) as a basis for adjusting the operating field of view volume of at least one of the vehicle's sensors to a different one of the plurality of operating field of view volumes, so as to cause the vehicle to operate using an operating field of view volume that accurately represents the space within which the sensor(s) can confidently detect objects when the second environmental condition is present. The disclosed methods can occur in real-time or in near-real-time as the vehicle system compares newly-acquired sensor data associated with the target object to past sensor data associated with the target object.

As an example, a lidar sensor of the vehicle may have an operating field of view volume for use in clear weather conditions and during the daytime, and that operating field of view volume may include a range of 200 meters or more. During these environmental conditions, the vehicle can determine a lidar intensity from laser beams reflected off a target object in the distance, such as a telephone pole. Later, however, during densely foggy conditions during the daytime, the lidar intensity from the same target object might degrade. Based on this degradation, the vehicle system might adjust the operating field of view volume of at least one of the lidar sensors of the vehicle to an operating field of view volume that includes a range of 100 meters, for example.

The present disclosure also provides operations for adjusting the operating field of view volume of one type of sensor (e.g., a camera) based on degraded parameter(s) determined from sensor data received from another type of sensor (e.g., a lidar sensor), and vice versa.

Implementations of the disclosed systems and methods advantageously enable a vehicle system to adjust accepted sensor data in real time, so as to dynamically adapt to changing conditions during travel and enable the vehicle to accurately and confidently detect objects in its environment continuously. The disclosed systems and methods also provide efficient, reliable ways to use known target objects in a vehicle's environment to determine accurate adjustments to sensor operating field of view volumes.

II. Example Systems and Devices

Example systems and devices will now be described in greater detail. In general, the embodiments disclosed herein can be used with any system that includes one or more sensors that scan an environment of the system. Illustrative embodiments described herein include vehicles that employ sensors, such as lidars, RADARs, SONARs, cameras, etc. However, an example system may also be implemented in or take the form of other devices, such as robotic devices, industrial systems (e.g., assembly lines, etc.), or mobile communication systems or devices, among other possibilities.

The term "vehicle" is broadly construed herein to cover any moving object, including, for instance, an aerial vehicle, watercraft, spacecraft, a car, a truck, a van, a semitrailer truck, a motorcycle, a golf cart, an off-road vehicle, an indoor robotic device, a warehouse transport vehicle, a forklift, a tractor, or a farm vehicle, as well as a carrier that rides on a track such as a roller coaster, trolley, tram, or train car, among other examples. Some vehicles may operate in a fully autonomous mode, where no human interaction is used for operations, a semi-autonomous mode, where no little human interaction is used for operations, or a human-operated mode, where a human operates the vehicle and sensors may aid the human.

In example embodiments, an example vehicle system may include one or more processors, one or more forms of memory, one or more input devices/interfaces, one or more output devices/interfaces, and machine-readable instructions that when executed by the one or more processors cause the system to carry out the various functions, tasks, capabilities, etc., described above. Example systems within the scope of the present disclosure will be described in greater detail below.

FIG. 1 is a functional block diagram illustrating a vehicle 100 according to an example embodiment. The vehicle 100 may be configured to operate fully or partially in an autonomous mode, and thus may be referred to as an "autonomous vehicle." The vehicle may also be configured to be operated by a human, but provide information to the human through the vehicle's sensing systems. For example, a computing system 111 can control the vehicle 100 while in an autonomous mode via control instructions to a control system 106 for the vehicle 100. The computing system 111 can receive information from one or more sensor systems 104, and base one or more control processes (such as setting a heading so as to avoid a detected obstacle) upon the received information in an automated fashion.

The autonomous vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode and a partially-autonomous and/or a fully-autonomous operation mode.

The vehicle 100 includes a propulsion system 102, a sensor system 104, a control system 106, one or more peripherals 108, a power supply 110, a computing system 111, and a user interface 112. The vehicle 100 may include more or fewer subsystems and each subsystem can optionally include multiple components. Further, each of the subsystems and components of vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments, the propulsion system 102 includes an engine/motor 118, an energy source 120, a transmission 122, and wheels/tires 124. The engine/motor 118 converts energy source 120 to mechanical energy. In some embodiments, the propulsion system 102 can optionally include one or both of engines and/or motors. For example, a gas-electric hybrid vehicle can include both a gasoline/diesel engine and an electric motor.

The energy source 120 represents a source of energy, such as electrical and/or chemical energy, that may, in full or in part, power the engine/motor 118. That is, the engine/motor 118 can be configured to convert the energy source 120 to mechanical energy to operate the transmission. In some embodiments, the energy source 120 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 120 can also provide energy for other systems of the vehicle 100.

The transmission 122 includes appropriate gears and/or mechanical elements suitable to convey the mechanical power from the engine/motor 118 to the wheels/tires 124. In some embodiments, the transmission 122 includes a gearbox, a clutch, a differential, a drive shaft, and/or axle(s), etc.

The wheels/tires 124 are arranged to stably support the vehicle 100 while providing frictional traction with a surface, such as a road, upon which the vehicle 100 moves. Accordingly, the wheels/tires 124 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. Any combination of the wheels/tires 124 of vehicle 100 may be operable to rotate differentially with respect to other wheels/tires 124. The wheels/tires 124 can optionally include at least one wheel that is rigidly attached to the transmission 122 and at least one tire coupled to a rim of a corresponding wheel that makes contact with a driving surface. The wheels/tires 124 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 126, an inertial measurement unit (IMU) 128, a radar unit 130, a laser rangefinder/lidar unit 132, a camera 134, and/or a microphone 136. The sensor system 104 could also include sensors configured to monitor internal systems of the vehicle 100 (e.g., 02 monitor, fuel gauge, engine oil temperature, wheel speed sensors, etc.). One or more of the sensors included in sensor system 104 could be configured to be actuated separately and/or collectively in order to modify a position and/or an orientation of the one or more sensors.

The GPS 126 is a sensor configured to estimate a geographic location of the vehicle 100. To this end, GPS 126 can include a transceiver operable to provide information regarding the position of the vehicle 100 with respect to the Earth.

The IMU 128 can include any combination of sensors (e.g., accelerometers and gyroscopes) configured to sense position and orientation changes of the vehicle 100 based on inertial acceleration.

The radar unit 130 can represent a system that utilizes radio signals to sense objects within the local environment of the vehicle 100. In some embodiments, in addition to sensing the objects, the radar unit 130 and/or the computing system 111 can additionally be configured to sense the speed and/or heading of the objects. The radar unit 130 may include any antenna(s), waveguide networks, communication chip(s), and/or other components that may facilitate radar operation.

Similarly, the laser rangefinder or lidar unit 132 can be any sensor configured to sense objects in the environment in which the vehicle 100 is located using lasers. The laser rangefinder/lidar unit 132 can include one or more laser sources, a laser scanner, and one or more detectors, among other system components. The laser rangefinder/lidar unit 132 can be configured to operate in a coherent (e.g., using heterodyne detection) or an incoherent detection mode.

The camera 134 can include one or more devices configured to capture a plurality of images of the environment surrounding the vehicle 100. The camera 134 can be a still camera or a video camera. In some embodiments, the camera 134 can be mechanically movable such as by rotating and/or tilting a platform to which the camera is mounted. As such, a control process of vehicle 100 may be implemented to control the movement of camera 134.

The sensor system 104 can also include a microphone 136. The microphone 136 can be configured to capture sound from the environment surrounding vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 138, throttle 140, brake unit 142, a sensor fusion algorithm 144, a computer vision system 146, a navigation/pathing system 148, and/or an obstacle avoidance system 150, etc.

The steering unit 138 is operable to adjust the heading of vehicle 100. For example, the steering unit can adjust the axis (or axes) of one or more of the wheels/tires 124 so as to effect turning of the vehicle. The throttle 140 is configured to control, for instance, the operating speed of the engine/motor 118 and, in turn, adjust forward acceleration of the vehicle 100 via the transmission 122 and wheels/tires 124. The brake unit 142 decelerates the vehicle 100. The brake unit 142 can use friction to slow the wheels/tires 124. In some embodiments, the brake unit 142 inductively decelerates the wheels/tires 124 by a regenerative braking process to convert kinetic energy of the wheels/tires 124 to electric current.

The sensor fusion algorithm 144 is an algorithm (or a computer program product storing an algorithm) configured to accept data from the sensor system 104 as an input. The data may include, for example, data representing information sensed at the sensors of the sensor system 104. The sensor fusion algorithm 144 can include, for example, a Kalman filter, Bayesian network, etc. The sensor fusion algorithm 144 provides assessments regarding the environment surrounding the vehicle based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations.

The computer vision system 146 can process and analyze images captured by camera 134 to identify objects and/or features in the environment surrounding vehicle 100. The detected features/objects can include traffic signals, roadway boundaries, other vehicles, pedestrians, and/or obstacles, etc. The computer vision system 146 can optionally employ an object recognition algorithm, a Structure From Motion (SFM) algorithm, video tracking, and/or available computer vision techniques to effect categorization and/or identification of detected features/objects. In some embodiments, the computer vision system 146 can be additionally configured to map the environment, track perceived objects, estimate the speed of objects, etc.

The navigation and pathing system 148 is configured to determine a driving path for the vehicle 100. For example, the navigation and pathing system 148 can determine a series of speeds and directional headings to effect movement of the vehicle along a path that substantially avoids perceived obstacles while generally advancing the vehicle along a roadway-based path leading to an ultimate destination, which can be set according to user inputs via the user interface 112, for example. The navigation and pathing system 148 can additionally be configured to update the driving path dynamically while the vehicle 100 is in operation on the basis of perceived obstacles, traffic patterns, weather/road conditions, etc. In some embodiments, the navigation and pathing system 148 can be configured to incorporate data from the sensor fusion algorithm 144, the GPS 126, and one or more predetermined maps so as to determine the driving path for vehicle 100.

The obstacle avoidance system 150 can represent a control system configured to identify, evaluate, and avoid or otherwise negotiate potential obstacles in the environment surrounding the vehicle 100. For example, the obstacle avoidance system 150 can effect changes in the navigation of the vehicle by operating one or more subsystems in the control system 106 to undertake swerving maneuvers, turning maneuvers, braking maneuvers, etc. In some embodiments, the obstacle avoidance system 150 is configured to automatically determine feasible ("available") obstacle avoidance maneuvers on the basis of surrounding traffic patterns, road conditions, etc. For example, the obstacle avoidance system 150 can be configured such that a swerving maneuver is not undertaken when other sensor systems detect vehicles, construction barriers, other obstacles, etc. in the region adjacent to the vehicle that would be swerved into. In some embodiments, the obstacle avoidance system 150 can automatically select the maneuver that is both available and maximizes safety of occupants of the vehicle. For example, the obstacle avoidance system 150 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 152, a touchscreen 154, a microphone 156, and/or a speaker 158.

In some embodiments, the peripherals 108 function to receive inputs for a user of the vehicle 100 to interact with the user interface 112. To this end, the touchscreen 154 can both provide information to a user of vehicle 100, and convey information from the user indicated via the touchscreen 154 to the user interface 112. The touchscreen 154 can be configured to sense both touch positions and touch gestures from a user's finger (or stylus, etc.) via capacitive sensing, resistance sensing, optical sensing, a surface acoustic wave process, etc. The touchscreen 154 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 156 can be configured to receive audio (e.g., a voice command or other audio input) from a user of the vehicle 100. Similarly, the speakers 158 can be configured to output audio to the user of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 152 can wirelessly communicate with one or more devices directly or via a communication network. The wireless communication system 152 can optionally use 3G cellular communication, such as CDMA, EVDO, GSM/GPRS, and/or 4G cellular communication, such as WiMAX or LTE. Additionally or alternatively, wireless communication system 152 can communicate with a wireless local area network (WLAN), for example, using WiFi. In some embodiments, wireless communication system 152 could communicate directly with a device, for example, using an infrared link, Bluetooth, and/or ZigBee. The wireless communication system 152 can include one or more dedicated short-range communication (DSRC) devices that can include public and/or private data communications between vehicles and/or roadside stations. Other wireless protocols for sending and receiving information embedded in signals, such as various vehicular communication systems, can also be employed by the wireless communication system 152 within the context of the present disclosure.

As noted above, the power supply 110 can provide power to components of vehicle 100, such as electronics in the peripherals 108, computing system 111, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and energy source 120 can be implemented together, as in some all-electric cars.

Many or all of the functions of vehicle 100 can be controlled via computing system 111 that receives inputs from the sensor system 104, peripherals 108, etc., and communicates appropriate control signals to the propulsion system 102, control system 106, peripherals, etc. to effect automatic operation of the vehicle 100 based on its surroundings. Computing system 111 includes at least one processor 113 (which can include at least one microprocessor) that executes instructions 115 stored in a non-transitory computer readable medium, such as the data storage 114. The computing system 111 may also represent a plurality of computing devices that serve to control individual components or subsystems of the vehicle 100 in a distributed fashion.

In some embodiments, data storage 114 contains instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information as map data 116. Such information may be used by vehicle 100 and computing system 111 during operation of the vehicle 100 in the autonomous, semi-autonomous, and/or manual modes to select available roadways to an ultimate destination, interpret information from the sensor system 104, etc.

The vehicle 100, and associated computing system 111, provides information to and/or receives input from, a user of vehicle 100, such as an occupant in a passenger cabin of the vehicle 100. The user interface 112 can accordingly include one or more input/output devices within the set of peripherals 108, such as the wireless communication system 152, the touchscreen 154, the microphone 156, and/or the speaker 158 to allow communication between the computing system 111 and a vehicle occupant.

The computing system 111 controls the operation of the vehicle 100 based on inputs received from various subsystems indicating vehicle and/or environmental conditions (e.g., propulsion system 102, sensor system 104, and/or control system 106), as well as inputs from the user interface 112, indicating user preferences. For example, the computing system 111 can utilize input from the control system 106 to control the steering unit 138 to avoid an obstacle detected by the sensor system 104 and the obstacle avoidance system 150. The computing system 111 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 134 can capture a plurality of images that represent information about an environment of the vehicle 100 while operating in an autonomous mode. The environment may include other vehicles, traffic lights, traffic signs, road markers, pedestrians, etc. The computer vision system 146 can categorize and/or recognize various aspects in the environment in concert with the sensor fusion algorithm 144, the computing system 111, etc. based on object recognition models pre-stored in data storage 114, and/or by other techniques.

Although the vehicle 100 is described and shown in FIG. 1 as having various components of vehicle 100, e.g., wireless communication system 152, computing system 111, data storage 114, and user interface 112, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

Figure 2:
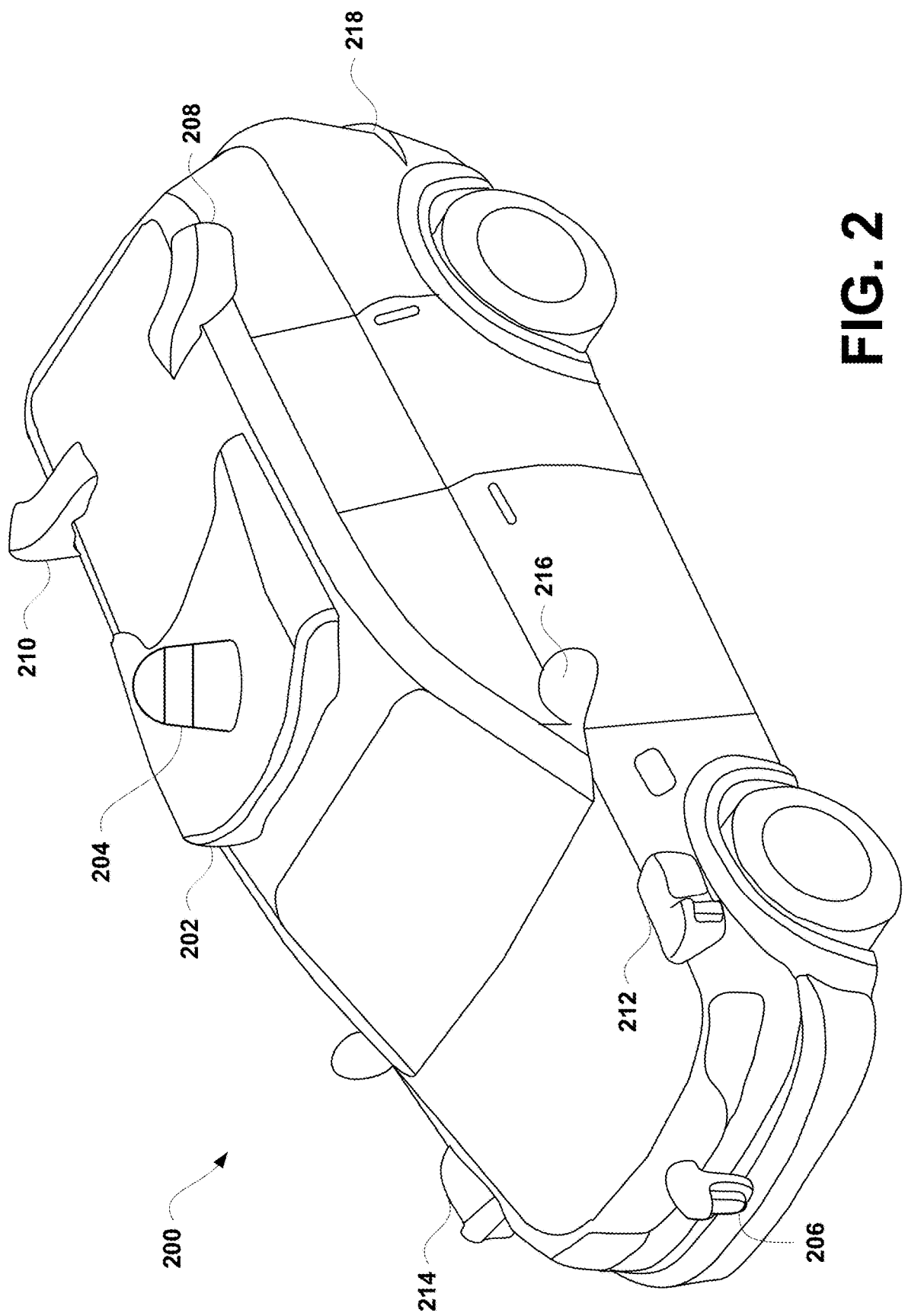
FIG. 2 depicts an exterior view of an example autonomous vehicle.

FIG. 2 shows an example vehicle 200 that can include some or all of the functions described in connection with vehicle 100 in reference to FIG. 1. Although vehicle 200 is illustrated in FIG. 2 as a four-wheel car for illustrative purposes, the present disclosure is not so limited. For instance, the vehicle 200 can represent a truck, a van, a semi-trailer truck, a motorcycle, a golf cart, an off-road vehicle, or a farm vehicle, etc.

The example vehicle 200 includes a sensor unit 202, a first lidar unit 204, a second lidar unit 206, a first radar unit 208, a second radar unit 210, a first lidar/radar unit 212, a second lidar/radar unit 214, and two additional locations 216, 218 at which a radar unit, lidar unit, laser rangefinder unit, and/or other type of sensor or sensor(s) could be located on the vehicle 200. Each of the first lidar/radar unit 212 and the second lidar/radar unit 214 can take the form of a lidar unit, a radar unit, or both.

Furthermore, the example vehicle 200 can include any of the components described in connection with vehicle 100 of FIG. 1. The first and second radar units 208, 210 and/or the first and second lidar units 204, 206 can actively scan the surrounding environment for the presence of potential obstacles and can be similar to the radar unit 130 and/or laser rangefinder/lidar unit 132 in the vehicle 100. Additionally, the first lidar/radar unit 212 and second lidar/radar unit 214 can actively scan the surrounding environment for the presence of potential obstacles and can be similar to the radar unit 130 and/or laser rangefinder/lidar unit 132 in the vehicle 100.

In some examples, the lidar units may be one of two different types of lidar unit. A first type of lidar unit may be a lidar that can continuously scan the full region of the lidar unit's field of view. A second type of lidar unit may be a lidar that can scan a specific region of the lidar unit's field of view when steered to do so. The first type of lidar unit may have a shorter range than the second type of lidar unit. The second type of lidar unit may have a smaller field of view when operating compared to the first lidar unit. In some examples, one or more of the designated lidar units of vehicle 200 may contain one or both types of lidar unit. For example, lidar unit 204 mounted on the top of the vehicle may contain both types of lidar units, or contain a lidar unit capable of both continuous and steered scanning. In one example, the second type of lidar unit may have a field of view in operation that is 5 to 15-degrees wide in the horizontal plane and 5 to 25-degrees wide in the vertical plane.

The sensor unit 202 is mounted atop the vehicle 200 and includes one or more sensors configured to detect information about an environment surrounding the vehicle 200, and output indications of the information. For example, sensor unit 202 can include any combination of cameras, radars, lidars, range finders, acoustic sensors, and weather-related sensors such as barometers, humidity sensors, and the like. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, although other mounting locations are possible. Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned in conjunction with or independently of other sensors of sensor unit 202.

In an example configuration, one or more radar scanners (e.g., first and second radar units 208, 210) can be located near the rear of the vehicle 200, to actively scan the region in the back of the car 200 for the presence of radio-reflective objects. Similarly, the first lidar/radar unit 212 and the second lidar/radar unit 214 may be mounted near the front of the vehicle to actively scan a region in front of the vehicle. A radar scanner can be situated, for example, in a location suitable to illuminate a region including a forward-moving path of the vehicle 200 without occlusion by other features of the vehicle 200. For example, a radar scanner can be situated to be embedded and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

In practice, each radar unit may be able to scan over a 90-degree beamwidth. When radar units are placed at the corners of the vehicle, as shown by radar units 208, 210, 212, and 214, each radar unit may be able to scan a 90-degree field of view in the horizontal plane and provide the vehicle with a radar field of view of the full 360-degree area around the vehicle. Further, the vehicle may also include two side-facing radar units. The side-facing radar units may be able to provide further radar imaging when other radar units are obstructed, such as when making a protected right hand turn (i.e., a right-hand turn when there's another vehicle in the lane to the left of the turning vehicle).

Although not shown in FIG. 2, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include dedicated short-range communications (DSRC), radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. In one particular example, the sensor unit 202 may contain both optical cameras (i.e., cameras that capture human-visible light) and infrared cameras. Infrared cameras may be able to capture images of heat within the camera's field of view.

The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

Further, the camera sensor may be configured with a rolling shutter. A rolling shutter generally will iteratively sample the light sensor to capture image data. The data from the camera sensor may form an image, a plurality of images, or a video. For example, in a traditional image sensor, a rolling shutter may iteratively sample the light sensor one row of cells at a time. When sampling a camera sensor that has a rolling shutter, objects in the field of view of the sensor that have a high speed may appear distorted. Such distortions are caused by the iterative sampling. Because lines of cells are sampled iteratively, the object being imaged moves slightly between each sampling. Therefore, each line will be sampled a slightly later time than the previous line. Due to the delay in sampling respective lines an object having horizontal motion may have a horizontal skew. For example, a vehicle moving across the field of view of the sensor may have a horizontal skew and vertical compression (or expansion) that distorts the vehicle. This skew may be troublesome for processing based on the horizontal location of objects in an image. The present system may help identify possible camera distortions caused by a rolling shutter.

Figure 3:
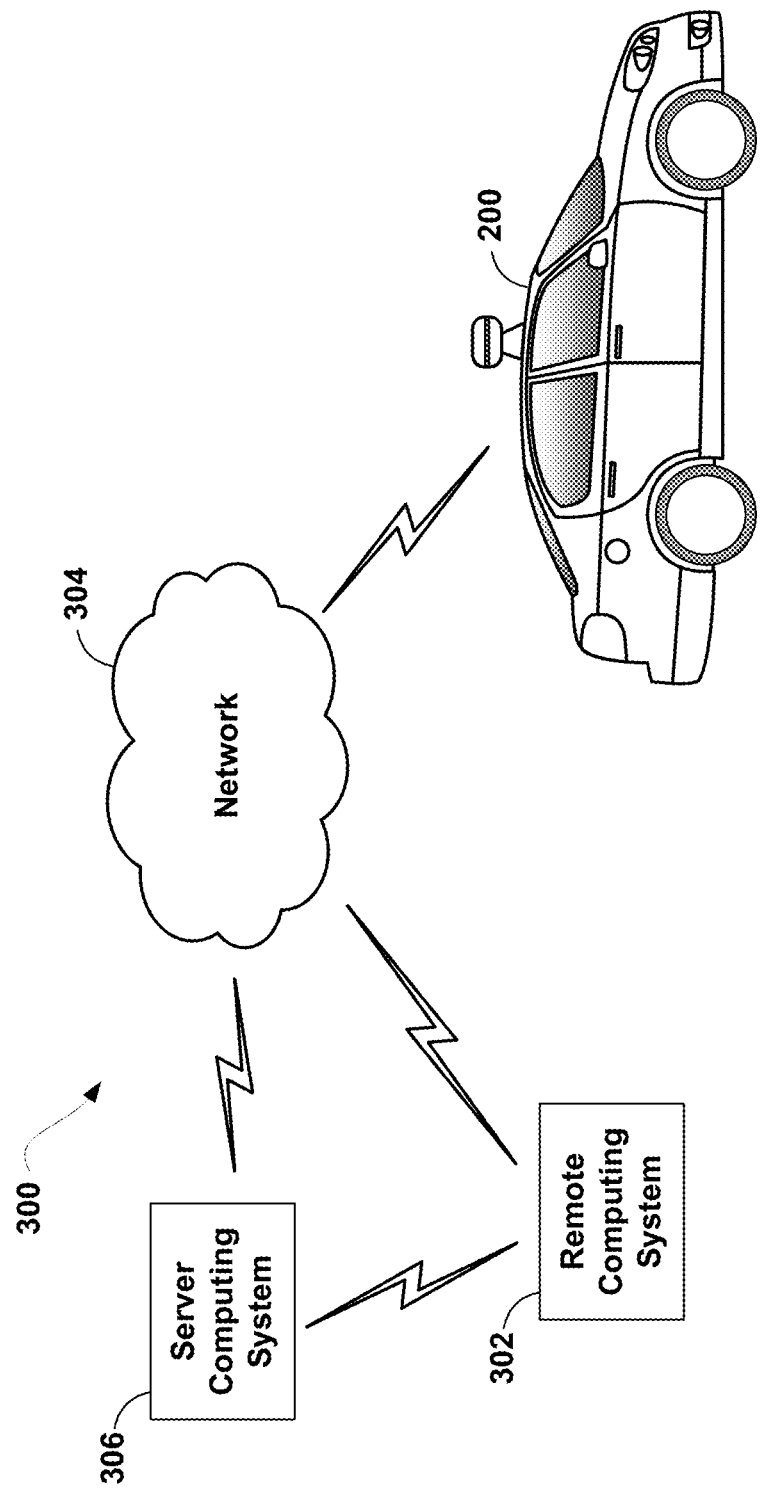
FIG. 3 is a conceptual illustration of wireless communication between various computing systems related to an autonomous vehicle.

FIG. 3 is a conceptual illustration of wireless communication between various computing systems related to an autonomous vehicle, according to an example implementation. In particular, wireless communication may occur between remote computing system 302 and vehicle 200 via network 304. Wireless communication may also occur between server computing system 306 and remote computing system 302, and between server computing system 306 and vehicle 200. During the operation of the vehicle 200, the vehicle may send and receive data from both the server computing system 306 and remote computing system 302 to aid in the operation of the vehicle 200. The vehicle 200 may communicate data related to its operation and data from its sensors to the server computing system 306 and the remote computing system 302. Additionally, the vehicle 200 may receive operational instructions and/or data related to objects sensed by the vehicle's sensors from the server computing system 306 and remote computing system 302.

Vehicle 200 can correspond to various types of vehicles capable of transporting passengers or objects between locations, and may take the form of any one or more of the vehicles discussed above.

Remote computing system 302 may represent any type of device related to remote assistance and operation techniques, including but not limited to those described herein. Within examples, remote computing system 302 may represent any type of device configured to (i) receive information related to vehicle 200, (ii) provide an interface through which a human operator or computer operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some implementations, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some implementations, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some implementations of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, or perhaps server computing system 306, or a computing system local to vehicle 200) may operate to use a camera to capture images of the environment of an autonomous vehicle. In general, at least one computing system will be able to analyze the images and possibly control the autonomous vehicle.

In some implementations, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a radar unit may be configured to transmit an electromagnetic signal that reflects off one or more objects near the vehicle. The radar unit may then capture electromagnetic signals that reflect off the objects. The captured reflected electromagnetic signals may enable the radar system (or processing system) to make various determinations about objects that reflected the electromagnetic signal. For example, the distance and position to various reflecting objects may be determined. In some implementations, the vehicle may have more than one radar in different orientations. In practice, a vehicle may have six different radar units. Additionally, each radar unit may be configured to steer a beam to one of four different sectors of the radar unit. In various examples, the radar unit may be able to scan a beam over a 90-degree range, by scanning each of the four different sectors of the radar unit. The radar system may be configured to store captured information to a memory for later processing by a processing system of the vehicle. The information captured by the radar system may be environment data.

In another example, a laser range finder (e.g., lidar unit) may be configured to transmit an electromagnetic signal (e.g., light, such as that from a gas or diode laser, or other possible light source) that may reflect off one or more target objects near the vehicle. The laser range finder may be able to capture the reflected electromagnetic (e.g., laser) signals. The captured reflected electromagnetic signals may enable the range-finding system (or processing system) to determine a range to various objects, such as the objects that reflected the electromagnetic signals back to the laser range finder. The range-finding system may also be able to determine a velocity or speed of target objects and store it as environment data.

In some implementations, the processing system may be able to combine information from the various sensors in order to make further determinations of the environment of the vehicle. For example, the processing system may combine data from both radar information and a captured image to determine if another vehicle or pedestrian is in front of the autonomous vehicle. In other implementations, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle.

The vehicle may detect objects of the environment in various ways depending on the source of the environment data. In some implementations, the environment data may come from a camera and be image or video data. The vehicle may analyze the captured image or video data to identify objects in the image or video data. In other implementations, the environment data may come from a lidar unit. The methods and apparatuses may be configured to monitor image and/or video data for the presence of objects of the environment. In other implementations, the environment data may be radar, audio, or other data. The vehicle may be configured to identify objects of the environment based on the radar, audio, or other data.

In some implementations, the techniques the vehicle uses to detect objects may be based on a set of known data. For example, data related to environmental objects may be stored to a memory located in the vehicle. The vehicle may compare received data to the stored data to determine objects. In other implementations, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

II. Example Vehicle Sensor Fields of View

Figure 4:
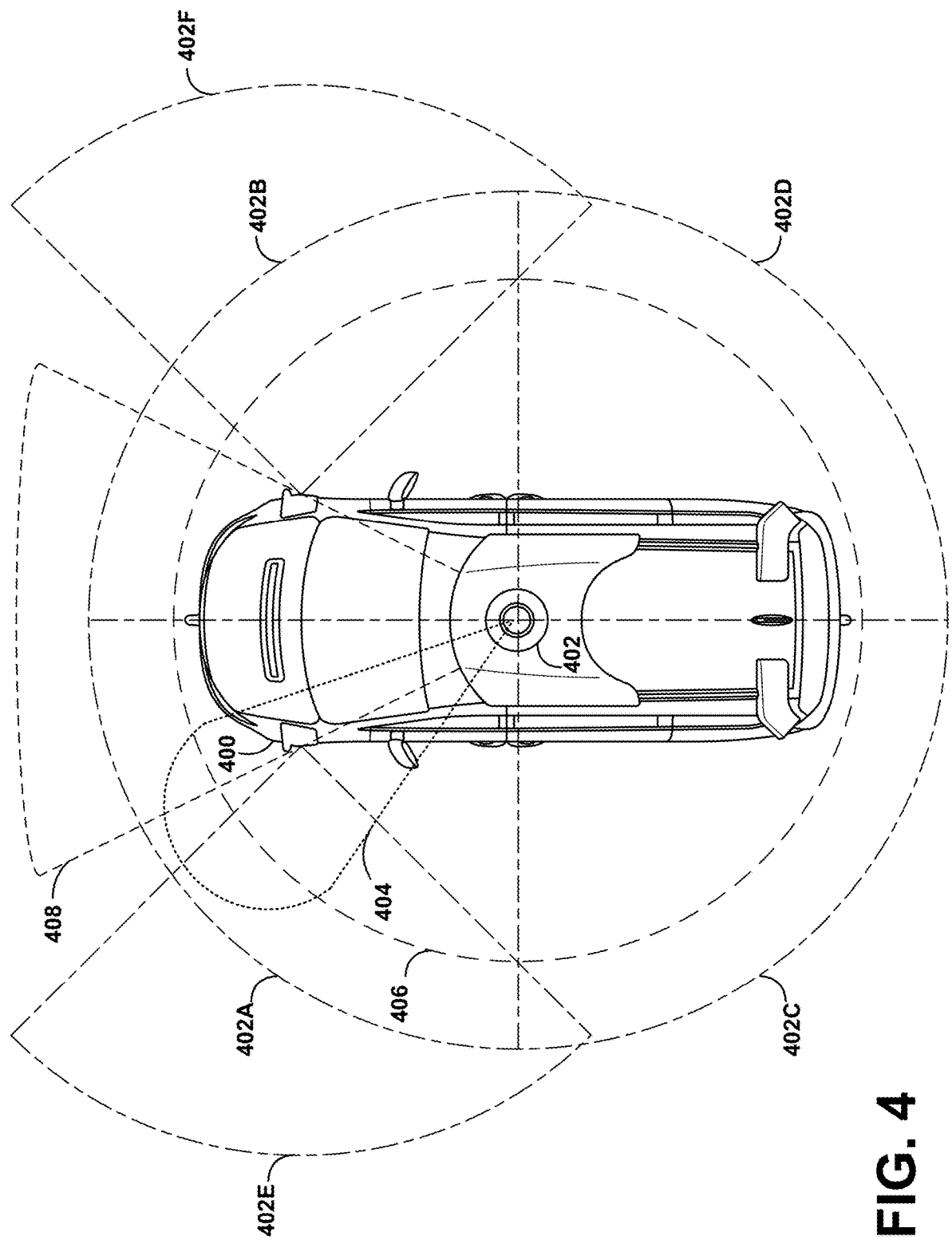
FIG. 4 illustrates one example set of sensor field of view.

FIG. 4 illustrates an example autonomous vehicle 400 having various sensor fields of view. As previously discussed with respect to FIG. 2, a vehicle 400 may contain a plurality of sensors. The locations of the various sensors may correspond to the locations of the sensors disclosed in FIG. 2. However, in some instances, the sensors may have other locations. Sensors locations are omitted from FIG. 4A for simplicity of the drawing. For each sensor unit of vehicle 400, FIG. 4A shows a respective field of view. The field of view of a sensor may include an angular region over which the sensor may detect objects and a range that corresponds to maximum distance from the sensor at which the sensor may reliably detect objects.

As previously disclosed, a vehicle 400 may include six radar units. A first radar unit may be located on the front-left of the vehicle and have an angular field of view corresponding to the angular portion of field of view 402A. A second radar unit may be located on the front-right of the vehicle and have an angular field of view corresponding to the angular portion of the field of view 402B. A third radar unit may be located on the rear-left of the vehicle and have an angular field of view corresponding to the angular portion of field of view 402C. A fourth radar unit may be located on the rear-right of the vehicle and have an angular field of view corresponding to the angular portion of field of view 402D. A fifth radar unit may be located on the left side of the vehicle and have an angular field of view corresponding to the angular portion of field of view 402E. A sixth radar unit may be located on the right side of the vehicle and have an angular field of view corresponding to the angular portion of field of view 402F. Each of the six radar units may be configured with a scannable beamwidth of 90 degrees or more, for example. A radar beamwidth may be smaller than 90 degrees, but each radar unit may be able to steer the radar beam across the full field of view.

A first lidar unit of the vehicle 400 may be configured to scan the full or within the full 360-degree region around the vehicle as shown by an angular field of view corresponding to the angular portion of field of view 404. A second lidar unit of the vehicle 400 may be configured to scan a region smaller than the 360-degree region around the vehicle. In one example, the second lidar unit may have a 5 to 15-degree field of view in the horizontal plane as shown by an angular field of view corresponding to the angular portion of field of view 404.

Additionally, the vehicle may also include at least one camera. The camera may be an optical camera and/or an infrared camera. The camera may have an angular field of view corresponding to the angular portion of field of view 408.

In addition to the field of view for each of the various sensors of vehicle 400, each sensor may also have a corresponding range. In one example, the range of the radar units may be greater than the range of either lidar unit, as shown by the field of the views of the radar units 402A-402E extending further than the fields of view for the lidar units 404 and 406. Additionally, the first lidar unit may have a range that is greater than a range of the second lidar unit, as shown by field of view 404 extending further than field of view 406. The camera may have a range shown by the extent of the field of view 408. In various examples, the range of the camera may be greater than or less than the range of the other sensors.

It should be understood that the sensor fields of view, radar units, etc. of FIG. 4 are depicted as an example illustration and are not to scale.

IV. Example Systems and Methods

Example systems and methods of the present disclosure will now be described in more detail.

Figure 5:
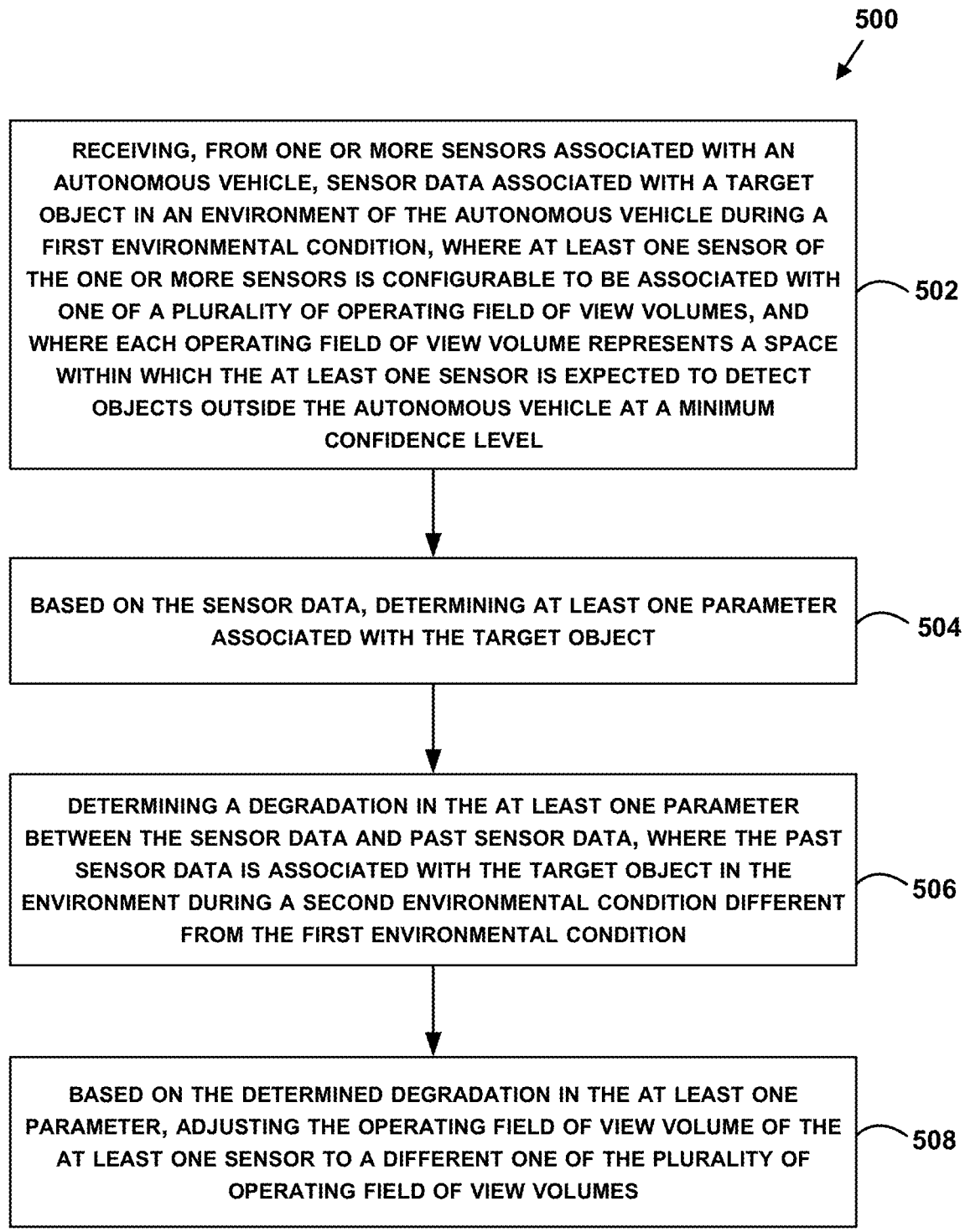
FIG. 5 illustrates an example method.

FIG. 5 is a flowchart of a method 500, according to an example embodiment. Method 500 may include one or more operations, functions, or actions as illustrated by one or more of blocks 502-508. Although the blocks of each method are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500, and other processes and methods disclosed herein, the flowcharts show functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Additionally or alternatively, for the method 500, and other processes and methods disclosed herein, one or more blocks in the flowchart may represent circuitry that is wired to perform the specific logical functions in the process.

In some examples, for the method 500, and other processes and methods disclosed herein, the functions described in the flowchart may be performed by a single vehicle (e.g., vehicle 100, 200, etc.), distributed between multiple vehicles, performed by a remote server/external computing system (e.g., systems 302 and 306), and/or performed by a combination of one or more external computing systems and one or more vehicles, among other possibilities. Furthermore, the functions described in the flowchart may be performed by one or more processors of the vehicle's control system and/or by one or more chips that control operation of one or more of the vehicle's sensors.

At block 502, method 500 involves receiving, from one or more sensors associated with an autonomous vehicle, sensor data associated with a target object in an environment of the autonomous vehicle during a first environmental condition, where at least one sensor of the one or more sensors is configurable to be associated with one of a plurality of operating field of view volumes, and where each operating field of view volume represents a space within which the at least one sensor is expected to detect objects outside the autonomous vehicle at a minimum confidence level.

At block 504, method 500 involves based on the sensor data, determining at least one parameter associated with the target object.

At block 506, method 500 involves determining a degradation in the at least one parameter between the sensor data and past sensor data, where the past sensor data is associated with the target object in the environment during a second environmental condition different from the first environmental condition.

At block 508, method 500 involves based on the determined degradation in the at least one parameter, adjusting the operating field of view volume of the at least one sensor to a different one of the plurality of operating field of view volumes.

In some embodiments, method 500 can be repeated across multiple successive camera images (i.e., frames) of the target object and/or across multiple successive instances of capturing lidar data associated with the target object, and can be performed using the same one or more sensors or using other sensors. This repetition can help validate the decision of which operating field of view volume to select and can help check whether a determined degradation was due to a change in environmental conditions as opposed to other factors (e.g., sensor drift).

The one or more sensors involved in method 500 can include a set of one or more lidar sensors, a set of one or more radar sensors, and/or a set of one or more cameras (operating in various wavelength bands including visible and infrared), among other possible sensor types. In practice, all sensors of a particular type may be configured to have the same operating field of view volume, such that vehicle software that receives and processes sensor data is configured to treat all sensors of the particular type as having the operating field of view volume. For example, in a clear weather, daytime environmental condition, all cameras of the vehicle can have an operating field of view range of 150 meters and all lidar sensors of the vehicle can have an operating field of view range of 200 meters. Along these lines, the act of adjusting a field of view volume for at least one of the vehicle's sensors can involve making the same field of view adjustment to each sensor of a particular sensor type. For example, if the vehicle system determines an adjustment to make to lidar sensors based on the vehicle's operating environment, the vehicle system may make the adjustment to all of the vehicle's lidar sensors. Other examples are possible as well. Further, in alternative embodiments, operating sensor field of view volumes can be configured individually, such that a sensor of a particular sensor type can be configured to have a different operating field of view volume than another sensor of the same sensor type.

The one or more sensors can include one or more sensors mounted at one or more locations relative to the vehicle. In some embodiments, for example, the one or more sensors can consist of sensors mounted on the vehicle, such as a camera mounted at one location on the vehicle and a lidar sensor mounted at a different location on the vehicle, two or more cameras mounted at different locations on the vehicle, or two or more lidar sensors mounted at different locations on the vehicle. In other embodiments, the one or more sensors can include multiple sensors, at least one of which is mounted on the vehicle, and at least one other of which is mounted on a different vehicle. In still other embodiments, at least one of the one or more sensors can be mounted on a stationary object along a road on which the vehicle is travelling or is routed to travel. The stationary object can be a telephone pole, a road sign (e.g., a stop sign), a traffic light, or a building, among other possibilities. In embodiments where at least one sensor is remote from the vehicle, a server or other computing device can be used to facilitate communication of sensor data from the remote sensor(s) to the vehicle system. For instance, sensor data obtained by a sensor on a stationary object can be transmitted via a server to the vehicle system as the vehicle approaches or passes by the stationary object.

An environmental condition can be or include clear weather (e.g., sunny, not overcast, no rain, snow, or fog), daytime (e.g., a period of time ranging from sunrise to sunset), nighttime (e.g., a period of time ranging from sunset to sunrise), a rainy weather, snowy weather, foggy weather, overcast (e.g., more clouds and less light), and/or a sensor cleanliness condition in which the vehicle has detected that one or more sensors of the vehicle have dirt, water droplets, ice/frost, bug splat, oil, road grime, or another substance obstructing their covers/windows or other surface. Other environmental conditions are possible. Further, the environmental condition can be or include a combination of conditions. For example, an environmental condition can be a clear weather, sunny, daytime environmental condition (e.g., 11:00 AM and sunny). As another example, an operating environment can be a foggy, daytime environmental condition, or a rainy, daytime environmental condition. Moreover, in some examples, there may be environmental conditions having varying degrees of weather conditions, such as a severe snowstorm and/or wind, severe rain and/or wind, or fog density exceeding a predefined threshold, among other possibilities.

The target object can be an object in the environment of the vehicle that has properties that are likely to have an expected effect on the at least one parameter determined from the sensor data associated with the target object. Examples of such properties can include a particular material or materials of which the target object is made (e.g., wood), a reflectivity of the target object's surfaces, a color of the target object, a size of the target object, a shape of the target object, whether the object is static or dynamic, and whether the target object has sharp angles that might affect the brightness of the target object at varying angles of observation. In some embodiments, it may be desirable to have the target object be an object that is made of material that has low reflectivity (e.g., wood) and that has a shape (e.g., substantially round, with minimal or no sharp angles) that would be less likely to cause variance in the at least one parameter when sensor data is obtained for the object at different angles of observation. For example, the target object can be a wooden telephone pole that has low expected reflectivity and that is expected to have a higher contrast relative to a horizon during clear weather conditions. Other example target objects are possible as well, such as buildings, bridges, or other man-made objects.

In some embodiments, the target object can be an object or group of objects that is deliberately put in the environment to assist with the disclosed methods. For example, the target object can be manufactured with a black, minimally reflective surface, and a simple round design. Additionally or alternatively, the target object can be outfitted with one or more fiducial markers that have known properties. In other embodiments, the target object can be an object that is not deliberately placed in the environment for the purpose of assisting with the disclosed methods, but is rather inferred from the environment over time such that a profile of the object can be built. For example, as different vehicles drive by a telephone pole, sensor data associated with the telephone pole (e.g., images or lidar intensity data) can be acquired and used to generate a statistical profile that indicates various properties of the object as well as indicates how often the object is encountered by vehicles. For instance, the statistical profile might indicate whether the object is a static object that is not expected to move in the environment, or rather is a dynamic object that moves small amounts in a predictable or unpredictable manner. The statistical profile can also indicate one or more optical properties of the object as a function of sensor position. Other examples are possible as well.

When properties of the target object are known, variance in parameters determined from sensor data associated with the target object can be attributed with higher confidence to changing environmental conditions (e.g., weather and/or time of day), as opposed to being attributed to uncertainty regarding the object and its properties.

The past sensor data can include sensor data that was received from at least one of the one or more sensors and/or sensor data that was received from other sensors or another source. The past sensor data can be received during the period of time over which a statistical profile of the target object is being developed, or at a time thereafter.

As noted above, the past sensor data is associated with the target object in the environment during a second environmental condition different from the first environmental condition. For example, the past sensor data can include images of the target object, or lidar data representing the target object, during a clear weather condition and during a particular time of day during the daytime (e.g., 10:00 AM), whereas the sensor data can include images of the target object, or lidar data representing the target object, during a rainy, foggy, or snowy condition and during the same time of day as the past sensor data (e.g., 10:00 AM) or during the same part of day (e.g., morning, daytime).

The sensor data can include one or more images from one or more cameras, lidar data (e.g., 3D point cloud data, including point intensity) from one or more lidar sensors, and/or other types of sensor data from other types of sensors. Similarly, the past sensor data can include one or more past images from one or more cameras, past lidar data (e.g., 3D point cloud data, including point intensity) from one or more lidar sensors, and/or other types of past sensor data from other types of sensors.

In some embodiments, the at least one parameter that the vehicle system determines based on the sensor data can include a value comparing the target object and another area of the environment represented in the sensor data. For example, in a situation in which the sensor data includes one or more images, the at least one parameter can include a contrast ratio between, or other value comparing, the target object depicted in the one or more images and the horizon depicted in the one or more images. Using the contrast ratio can be a reliable indicator of when an operating field of view should be adjusted, since contrast can degrade with range in snowy or foggy weather.

Additionally or alternatively, the at least one parameter can include a value comparing an edge of the target object in the one or more images with another area of the one or more images, such as an area that depicts the horizon, the road, or another object. For example, the at least one parameter can include a ratio between, or other value comparing, an edge intensity of one or more edges of the target object with an edge intensity of one or more edges of another object depicted in the one or more images.

In other embodiments, the at least one parameter can include a lidar intensity from laser beams reflected off the target object and/or a quantity of laser beams reflected off the target object. In still other embodiments, the at least one parameter can include a value comparing a lidar intensity or quantity of laser beams reflected off the target object with a lidar intensity or quantity of laser beams reflected off another object in the environment, such as the road, a building, or another vehicle.

Example techniques for determining a degradation in the at least one parameter will now be described in more detail with respect to FIGS. 6A-6B and FIGS. 7A-7B.

Figure 6A:
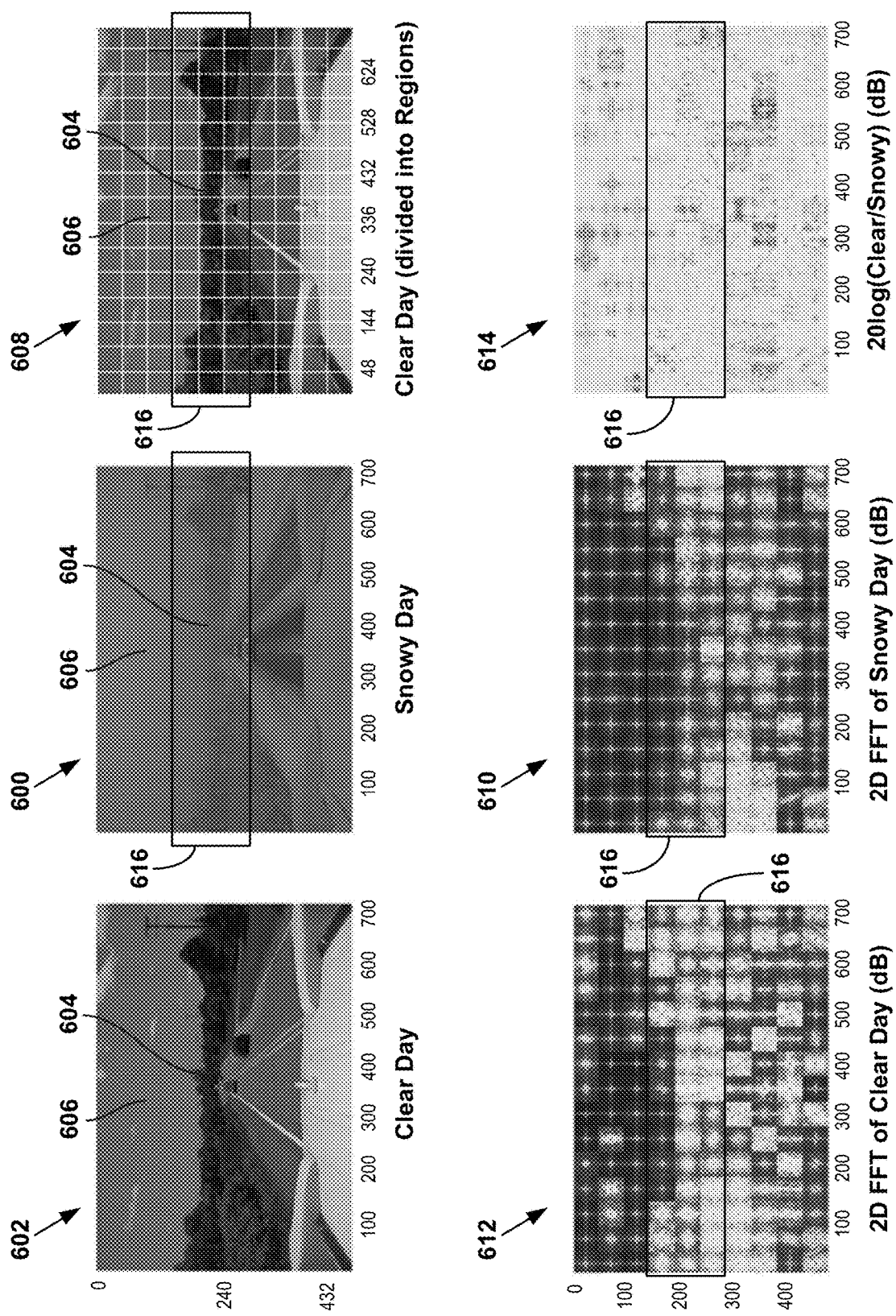
FIGS. 6A and 6B depict example images used to adjust an operating field of view volume of at least one sensor.
Figure 6B:
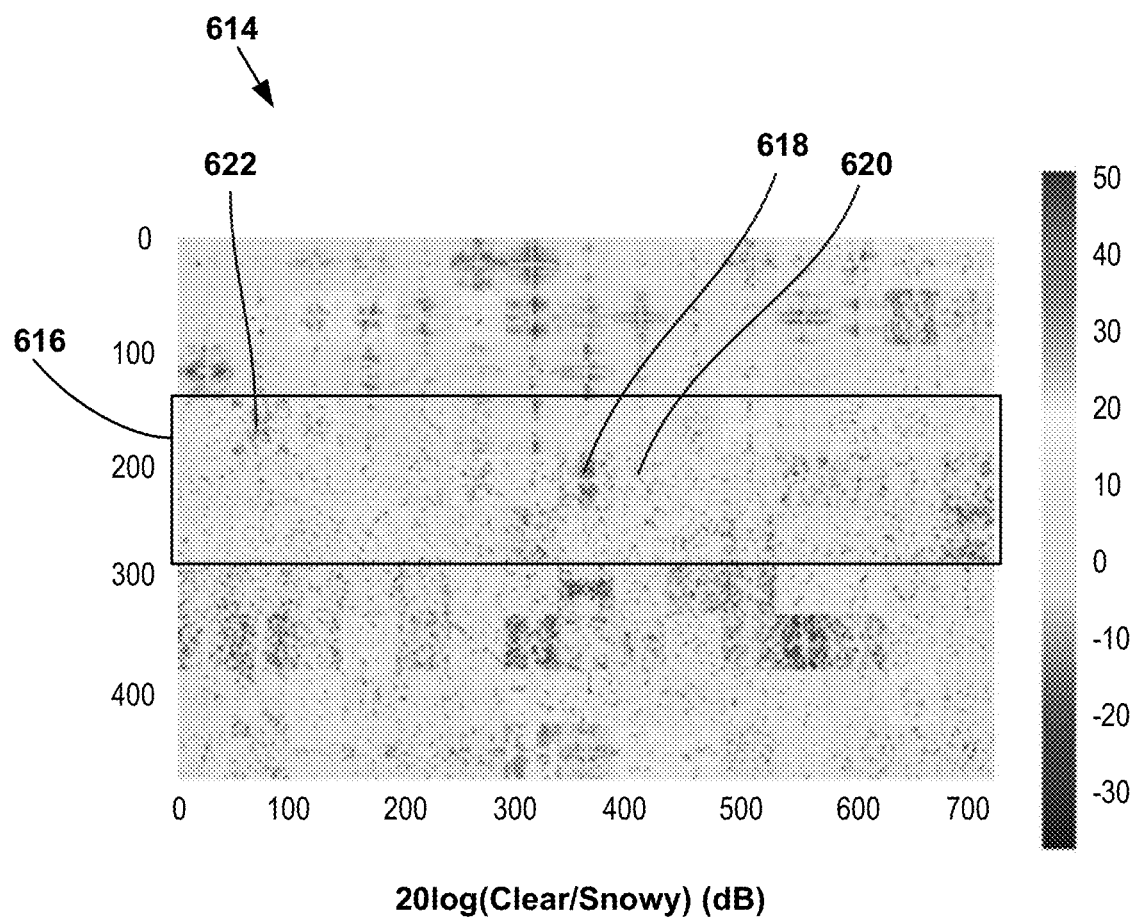

FIGS. 6A and 6B depict example images that can be used to determine a degradation in a contrast ratio or other value comparing the target object to the horizon depicted in the images. The horizon can be a reliable indicator of degradation, although other areas in the images could be used instead.

FIG. 6A depicts an image 600 and a past image 602, each of which depict a target object 604 and a horizon 606. In particular, the target object 604 in the images 600, 602 can be a treeline. Image 600 depicts the target object 604 and the horizon 606 during a daytime, snowy weather condition, and past image 602 depicts the target object 604 and the horizon 606 during a daytime, clear weather condition.

FIG. 6A also depicts a segmented version 608 of past image 602, particularly one that has been divided into a plurality of rectangular azimuth/elevation regions. These regions are representative examples of how images can be used for the purposes of determining a degradation in the at least one parameter, and it should be understood that other shapes, sizes, and quantities of regions can be used in alternative examples. For example, the vehicle system might only use regions of the images 600, 602 that include at least a portion of the target object 604. Furthermore, in some examples, the vehicle system can be configured to ignore or remove regions corresponding to dynamic objects in the environment (e.g., cars or clouds). Moreover, in other examples, the vehicle system can select which regions to use based on predetermined map data that indicates a known location of the target object 604.

In an example process for determining the degradation in the contrast ratio between the target object 604 and the horizon 606, the vehicle system can calculate a Fourier transform 610 of image 600 and can calculate a Fourier transform 612 of past image 602. Fourier transform 610 and Fourier transform 612 are each shown to be segmented in a similar manner as segmented version 608 of past image 602, such that each region in the Fourier transform takes the form of a plot of the power spectral density in azimuth/elevation of the corresponding region of the respective original image. In some examples, each of the Fourier transforms can be apodized with a raised-cosine.

Next, the vehicle system can calculate a ratio of Fourier transform 610 to Fourier transform 612. In particular, the vehicle system can calculate a ratio of each of one or more of the rectangular regions in Fourier transform 610 to the corresponding region in Fourier transform 612, including but not limited to one or more regions that correspond to the target object 604. As an example, FIG. 6A depicts an image 614 indicating a ratio of each region in Fourier transform 610 to each corresponding region in Fourier transform 612. FIG. 6B depicts a larger version of the image 614. FIGS. 6A and 6B also depict a bounding box emphasizing a particular area of interest 616 in the images 600, 602, the Fourier transforms 610, 612, and image 614. In particular, the area of interest 616 includes regions of interest that correspond to where the treeline meets the horizon 606 in the images 600, 602, as well as other regions bordering the regions of interest.

From image 614, the vehicle system can be configured to identify which regions indicate the largest difference between image 600 and past image 602—that is, which regions have the highest ratio—and to use that/those region(s) for determining how to adjust the operating field of view volume. For example, region 618 shown in FIG. 6B can indicate the strongest degree of degradation (e.g., approximately four orders of magnitude contrast-proxy degradation (−40 dB), as shown).

Based on the calculated ratio(s), and further based on a range of the target object 604 to the one or more cameras from which the images 600, 602 were received, the vehicle system can determine a degradation in the contrast ratio. The range of the target object 604 might be known to the vehicle system, such as from pre-existing map data, GPS data, and/or other data, or can be estimated using data acquired with the one or more sensors, such as clear-weather past image 602 and/or lidar data for one or more objects in the past image 602.

In some examples, degradation in contrast ratio can be represented by Equation 1, where $C\_o$ is the contrast between the target object 604 and the horizon 606 in a snowy (or foggy) condition (e.g., $C\_o=1$ for a black target object), k is the extinction length, and d is the range to the target object 604.

$$C=C\_o * \exp(-k*d) \quad \text{(Equation 1)}$$

Thus, for each region, the natural logarithm of the ratio of C to $C\_o$ can provide a k*d for that region, from which k can be estimated using a known value for d. As an example, if region 618 (−40 dB) is approximately 1000 meters down the road, k can be determined as shown in Equations 2-5.

$$20*\log 10(C/C\_o)=40 \quad \text{(Equation 2)}$$

$$C/C\_o=100 \quad \text{(Equation 3)}$$

$$\ln(C/C\_o)=\ln(100)=4.6=k*d \quad \text{(Equation 4)}$$

$$k=4.6/(1000 \text{ meters})=0.0046 \quad \text{(Equation 5)}$$

In other embodiments, the Fourier transforms 610, 612 can be compared in alternative ways, other than a ratio.

Certain areas (e.g., pixels) in the images shown in FIGS. 6A-6B might correspond to respective distances between objects and the one or more cameras (e.g., pixel 250 might correspond to the ground being approximately 50-70 meters away from the one or more cameras). Thus, in another example process for determining a degradation of the at least one parameter, the vehicle system can be configured to take an average across multiple regions, each corresponding to approximately the same distance—that is, a distance at which the target object 604 is estimated or known to be located.

To facilitate this, for example, the vehicle system can be configured to calculate a plurality of ratios of (i) a first plurality of regions in Fourier transform 610 that correspond to the target object 604 and further correspond to other portions of the environment that are located at approximately the same range to the one or more cameras as a range of the target object 604 to the one or more cameras to (ii) a second plurality of regions in Fourier transform 612 that correspond to the target object 604 and further correspond to the other portions of the environment. Both the first plurality of regions and the second plurality of regions can have the same quantity of regions. As shown in FIG. 6B, for instance, region 618 and region 620 could be used.

For an expedient approximation, for example, the vehicle system can then calculate an average ratio by summing the plurality of ratios and dividing that sum by the quantity of regions. For example, the vehicle system can take the average signal to noise ratio of all the regions containing pixel 250 (e.g., the regions in the same row as region 618, such as region 620). Based on the average ratio, and further based on a range of the target object 604 to the one or more cameras from which the images 600, 602 were received, the vehicle system can determine a degradation in the contrast ratio, such as by using the technique described above with respect to Equation 1.

In some examples, the vehicle system can use multiple regions having target objects at different ranges. For instance, the vehicle system can calculate k for region 618 and can calculate k for region 622, where region 622 might correspond to another target object in the environment, such as another tree, at a known range approximately equal to the range of the target object 604. If the snow (or fog, etc. in other situations) is substantially uniform in density, the calculated value of k for region 622 might be approximately the same as the calculated value of k for region 618.

Additionally or alternatively to using the technique described above, the vehicle system can implement edge detection techniques to determine the degradation of the at least one parameter in some examples.

Figure 7A:
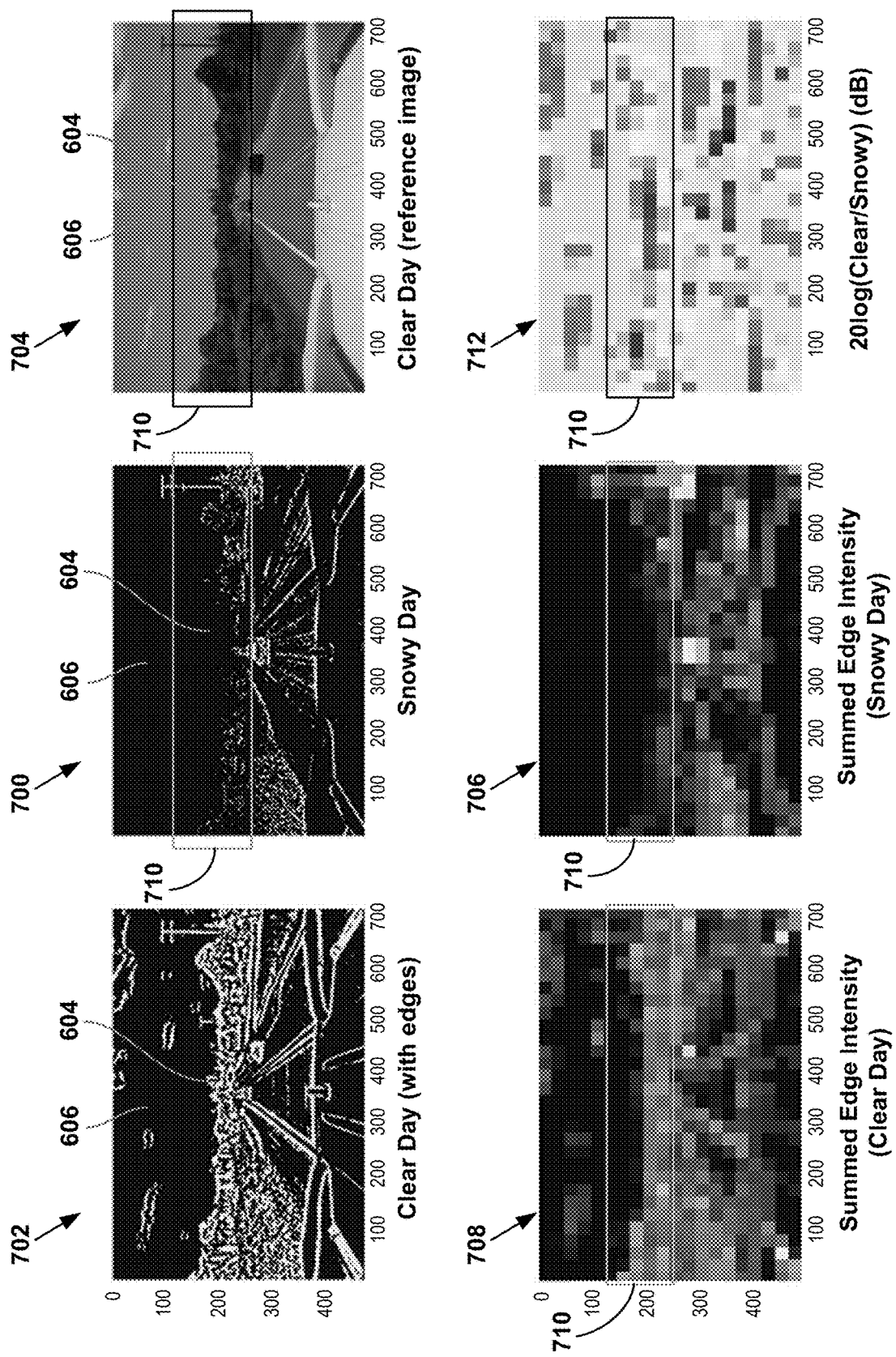
FIGS. 7A and 7B depict example images used to adjust an operating field of view volume of at least one sensor.

In an example process for determining the degradation in the contrast ratio between the target object 604 and the horizon 606 using edge detection techniques, the vehicle system can convolve a two-dimensional edge-detection kernel (e.g., an edge-detection kernel with a difference of Gaussians (DoG) filter) with the one or more images to determine first edge intensities in the one or more images, and can convolve the two-dimensional edge-detection kernel with the one or more past images to determine second edge intensities in the one or more past images. FIG. 7A shows an image 700 and a past image 702 after the convolving, where the image 700 depicts the target object 604 and the horizon 606 during a daytime, snowy weather condition, and past image 702 depicts the target object 604 and the horizon 606 during a daytime, clear weather condition. As with the previous example, the target object 604 is the treeline, although other objects could be used in other examples. FIG. 7A also depicts an example reference past image 704 before the convolving.

Next, the vehicle system can sum the first edge intensities in each of one or more first regions of the one or more images that correspond to the target object, and can sum the second edge intensities in each of one or more second regions of the one or more past images that correspond to the target object. FIG. 7A, for instance, depicts a segmented version 706 of image 700 and a segmented version 708 of past image 702. In the example shown, each image 706, 708 has been divided into a plurality of rectangular azimuth/ elevation regions and the edge intensities in each region have been summed. It should be understood that other shapes, sizes, and quantities of regions can be used in alternative examples.

Figure 7B:
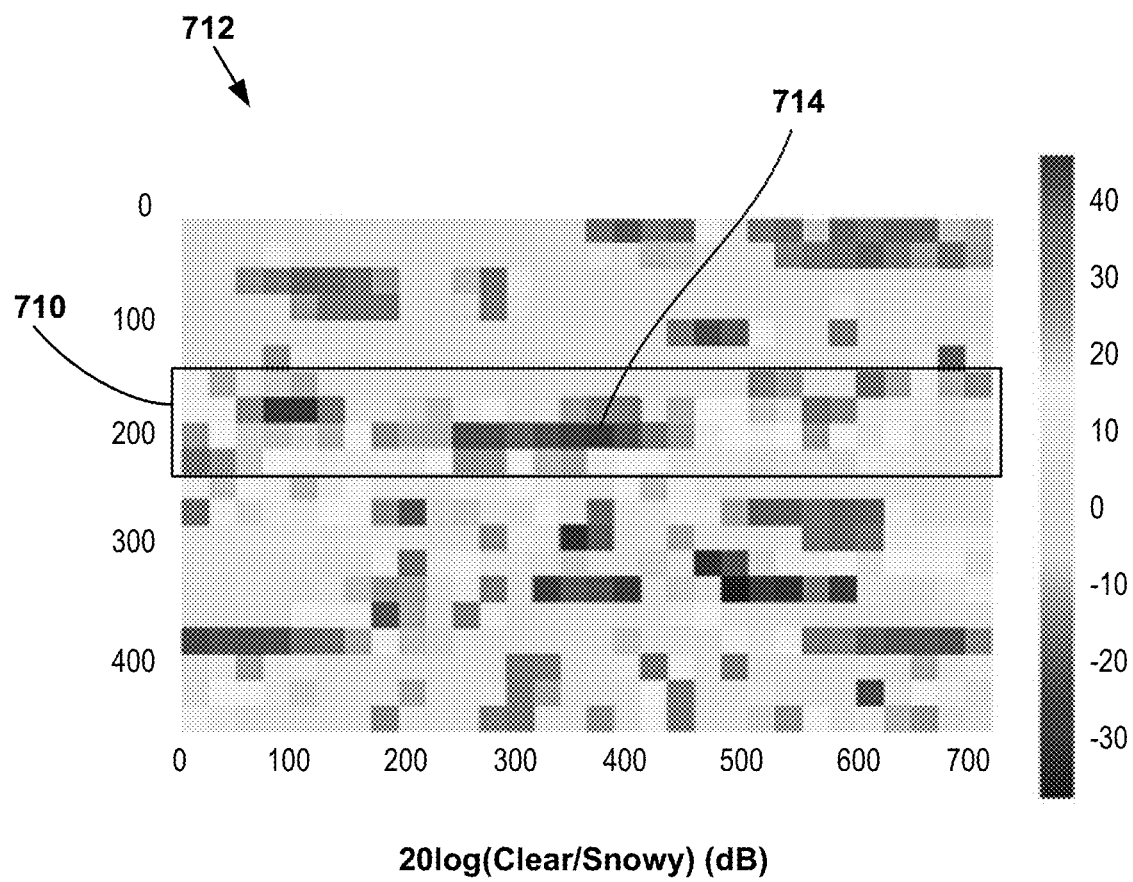

FIGS. 7A and 7B also depict a bounding box emphasizing a particular area of interest 710. Specifically, the area of interest 710 includes regions of interest that correspond to where the treeline (including target object 604) meets the horizon 606 in the images 700, 702, as well as other regions bordering the regions of interest. In some examples, the vehicle system might only sum edge intensities in a particular area of interest of an image, and not across an entire image.

The vehicle system can then calculate one or more ratios of the summed first edge intensities in each of the one or more first regions to the summed second edge intensities in each of the one or more second regions. As an example, FIG. 7A depicts an image 712 indicating a ratio of each region in image 708 to each corresponding region in image 706. FIG. 7B depicts a larger version of the image 712.

From image 712, the vehicle system can be configured to identify which regions indicate the largest difference between image 700 and past image 702—that is, which regions have the highest ratio—and to use that/those region(s) for determining how to adjust the operating field of view volume. For example, region 714 shown in FIG. 7B can indicate the strongest degree of degradation.

Based on the calculated ratio(s), and further based on a range of the target object 604 to the one or more cameras from which the images 700, 702 were received, the vehicle system can determine a degradation in the contrast ratio, such as by using the technique described above with respect to Equation 1.

In other embodiments, images 706, 708 can be compared in alternative ways, other than a ratio.

In some examples, the vehicle system can be configured to take an average across multiple regions of images 706 and 708, each region corresponding to approximately the same distance—that is, a distance at which the target object 604 is estimated or known to be located.

To facilitate this, for example, the vehicle system can be configured to (i) sum the first edge intensities in each of a first plurality of regions of image 700 that correspond to the target object 604 and further correspond to other portions of the environment that are located at approximately the same range to the one or more cameras as a range of the target object 604 to the one or more cameras and (ii) sum the second edge intensities in each of a second plurality of regions of the past image 702 that correspond to the target object 604 and further correspond to the other portions of the environment. Both the first plurality of regions and the second plurality of regions can have the same quantity of regions.

The vehicle system can then calculate a plurality of ratios of the summed first edge intensities in the first plurality of regions to the summed second edge intensities in the second plurality of regions. For example, the vehicle system can calculate ratios of at least a portion of the regions shown in image 706 (each of which represents a summation of the first edge intensities in that region of image 700) to at least a portion of corresponding regions in image 708 (each of which represents a summation of the second edge intensities in that region of image 712).

The vehicle system can then calculate an average ratio as a summation of the plurality of ratios divided by the quantity of regions. For example, the vehicle system can take the average signal to noise ratio of all the regions containing pixel 250 (e.g., the regions in the same row as region 710). Based on the average ratio, and further based on a range of the target object 604 to the one or more cameras from which the images 700, 702 were received, the vehicle system can determine a degradation in the contrast ratio, such as by using the technique described above with respect to Equation 1.

In some embodiments, the vehicle system can be configured to determine a degradation in edge intensity between one or more regions of the one or more images (e.g., one or more of the regions in image 700 representing the target object 604) and one or more corresponding regions of the one or more past images (e.g., one or more of the regions in past image 702 representing the target object 604), without performing operations that determine a degradation in contrast ratio. The vehicle system can then use the determined degradation in edge intensity as a basis to adjust the operating field of view volume of at least one of the vehicle's sensors.

In some embodiments, as discussed above, the at least one parameter can include a lidar intensity of laser beams reflected off a target object in the environment. The vehicle system can use lidar data and past lidar data to determine a degradation in the lidar intensity (e.g., the degradation represented in dB/meter) from laser beams reflected off the target object between the lidar data and the past lidar data. The vehicle system can then use the determined degradation in the lidar intensity as a basis for adjusting the field of view volume of each of at least one of the vehicle's one or more lidar sensors. In some examples, for a given degradation in lidar intensity, the maximum operating field of view range for a lidar sensor can be reduced by a factor equal to the square root of the degradation.

As noted above, the degraded parameter(s) determined from camera images can be used as a basis for adjusting the operating field of view volume of at least one lidar sensor. Similarly, the degraded parameter(s) determined from lidar data can be used as a basis for adjusting the operating field of view of at least one camera. One reason for this can be that contrast between a target object and the horizon degrades in a similar manner as light returns from the target object. In some situations, for instance, the distance from a lidar sensor at which approximately 95% of lidar intensity is lost by exponential decay can be approximately the same distance as the distance at which a contrast between a target object (ideally, a black target object) on the horizon exponentially decays to approximately 5%.

Thus, the act of adjusting the field of view volume of each of the one or more sensors based on the determined degradation in the at least one parameter can involve adjusting the field of view volume of each of at least one of the one or more cameras and each at least one of the one or more lidar sensors based on a determined degradation in lidar intensity between lidar data and past lidar data. Additionally or alternatively, the act of adjusting the field of view volume of each of the one or more sensors based on the determined degradation in the at least one parameter can involve adjusting the field of view volume of each of at least one of the one or more cameras and each at least one of the one or more lidar sensors based on a determined degradation in contrast ratio, edge intensity, and/or another parameter value between the one or more images and the one or more past images.

As an example, once k is calculated for contrast degradation using camera images as described above, the vehicle system can calculate how much a signal from the one or more lidar sensors is attenuated, because k for camera-visible wavelengths is likely to be similar to k for lidar wavelengths. For instance, in snowy or rainy conditions, the intensity of received light may be degraded by a factor of $\exp(-2k \cdot d)$, where d is the range to the target object, compared to clear weather conditions where k is approximately zero. The vehicle system can then use this degradation to infer the degraded field of view volume for the one or more lidar sensors in the direction of the target object.

To facilitate the act of adjusting the operating field of view volume of the at least one sensor to a different one of the plurality of operating field of view volumes based on the determined degradation in the at least one parameter, the vehicle system can store in memory (e.g., data storage 114) a table or other form of data that maps each of one or more parameter values (e.g., contrast ratio, lidar intensity, edge intensity, etc.) to each of a corresponding finite/predetermined number of operating field of view volumes. Thus, when the vehicle system determines a degradation, the vehicle system can select a different one of the plurality of operating field of view volumes, particularly the one that corresponds to the degraded parameter value. As another example, the vehicle system can determine the range, azimuth, and/or elevation of a new operating field of view volume based on the determined degradation. Further, the table or other form of data might also map each of the finite/predetermined number of operating field of view volumes and/or each of the corresponding one or more parameter values to a label that identifies the environmental condition (e.g., snowy, foggy, or clear) or combination of environmental conditions (e.g., daytime and snowy, or daytime and foggy). The memory in which the table or other data is stored and from which the table or other data is accessed can be local to the vehicle (e.g., in a memory onboard the vehicle) or can be remote from the vehicle (e.g., a database accessible via a server).

In some embodiments, the corresponding finite/predetermined number of operating field of view volumes can include multiple sets of operating field of view volumes that correspond to a given one of the one or more parameter values, each set having a finite/predetermined number of operating field of view volumes that are associated with a given type of sensor (e.g., a lidar sensor) or a specific one of the one or more sensors (e.g., a lidar sensor on the left side of the vehicle). For instance, to facilitate the act of adjusting the operating field of view volume of a first type of sensor based on the degradation of at least one parameter determined from sensor data of a second, different type of sensor, a parameter value can be mapped to two sets of operating field of view volumes—one for the first type of sensor (e.g., cameras) and another for the second type of sensor (e.g., lidar sensors).

In some embodiments, the sensor data used to determine the degradation can be sensor data that is not acquired by sensors mounted to the vehicle, but the determined degradation can be used as a basis for adjusting the operating field of view volume for at least one of the sensors that are mounted to the vehicle. For example, a camera can be mounted to another vehicle or a traffic light at an intersection, and can acquire images that a computing device other than the vehicle system (e.g., a server or a vehicle system of the other vehicle) can use to determine a degradation in contrast ratio. The computing device can then transmit, to the vehicle system, a signal indicating the determined degradation, so that the vehicle system can then use the determined degradation as a basis for adjusting the operating field of view of one or more of the cameras and/or lidar sensors mounted to the vehicle. Alternatively, the computing device can transmit the images themselves to the vehicle system and the vehicle system can determine the degradation. Other examples are possible as well.

Upon adjusting the operating field of view volume of the at least one sensor, the vehicle system can control the vehicle to operate using the at least one sensor having the adjusted operating field of view volume. That is, the vehicle system can control the vehicle, while operating in the autonomous mode, to acquire sensor data using the at least one sensor based on the adjusted operating field of view volume. To facilitate this in some embodiments, a local computing system onboard the vehicle can set itself to ignore sensor data readings acquired during operation of the vehicle that exceed the respective range, azimuth, and/or elevation associated with the adjusted operating field of view volume for each of the at least one sensor. Additionally or alternatively, a remote system can transmit an instruction to the local computing system of the vehicle that, upon receipt by the local computing system, causes the local computing system to control the vehicle to operate in an autonomous mode in which the local computing system ignores sensor data readings that exceed the respective range, azimuth, and/or elevation associated with the adjusted operating field of view volume for each of the at least one sensor. Other examples are possible as well. As noted above, the at least one sensor having the adjusted operating field of view volume might include at least one sensor that is mounted to the vehicle and/or at least one sensor that is located remote from the vehicle but that is still used by the vehicle system to facilitate operation of the vehicle.

In some embodiments, even though the particular operating field of view volume that is used for a given sensor at a give point in time might be less than the maximum operating field of view value for that sensor and parameter, the sensor might still be configured to acquire and transmit to the vehicle system (e.g., to a processor configured to process the sensor data) sensor data corresponding to a range, azimuth, and/or elevation beyond a respective range, azimuth, and/or elevation associated with that particular operating field of view volume. In such embodiments, the vehicle system may ignore (e.g., discard, or store but not use as a basis for making determinations about the environment of the vehicle, such as object detections) sensor data corresponding to a range, azimuth, and/or elevation that is greater than a respective range, azimuth, and/or elevation associated with the particular operating field of view volume. For example, if a lidar sensor's range has been reduced from 200 meters to 150 meters, the vehicle system may ignore sensor data corresponding to distances from the vehicle that exceed 150 meters. Other examples are possible as well. Additionally or alternatively, the vehicle system may identify (e.g., flag, or otherwise store an indication in memory that data is potentially suspect) sensor data corresponding to a parameter value greater than a maximum parameter value of the particular operating field of view volume. In alternative embodiments, such a sensor might be configured such that the sensor can set itself to not acquire sensor data corresponding to ranges, azimuths, and/or elevations beyond the respective ranges, azimuths, and/or elevations associated with the particular operating field of view volume. Additionally or alternatively, the sensor might be configured to acquire sensor data corresponding to ranges, azimuths, and/or elevations beyond the respective ranges, azimuths, and/or elevations associated with the particular operating field of view volume, but further configured to discard such sensor data, so as to reduce the amount of data transmitted from the sensor to other computing devices of the vehicle system.

In some embodiments, the vehicle's sensors and associated computing devices, such as a chip (e.g., microchip) that controls operation of one or more sensors, can perform operations before the sensors transmit acquired sensor data to the onboard computer or remote computer, which can affect how the onboard computer or remote computer control operation of the vehicle. In particular, such a sensor chip can perform one or more operations of the method 500. In this context, the act of adjusting the operating field of view volume can involve the sensor chip ignoring or flagging sensor data corresponding to ranges, azimuths, and/or elevations greater than the respective ranges, azimuths, and/or elevations associated with the adjusted operating field of view volume. Additionally or alternatively, the act of adjusting the operating field of view volume can involve the sensor chip (i) adjusting a power level of a laser pulse transmitted by one or more lidar sensors in acquiring sensor data from a first power level to an adjusted power level different from the first power level and/or (ii) acquiring sensor data by transmitting one or more laser pulses at the adjusted power level associated with the adjusted operating field of view volume. Other examples are possible as well.

By the term "substantially," "approximately," or "about" used herein, it is meant that the recited characteristic, parameter, value, or geometric planarity need not be achieved exactly, but that deviations or variations, including for example, tolerances, measurement error, measurement accuracy limitations and other factors known to skill in the art, may occur in amounts that do not preclude the effect the characteristic was intended to provide.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A method comprising:
receiving, from one or more sensors associated with an autonomous vehicle, sensor data associated with a target object in an environment of the autonomous vehicle, wherein at least one sensor of the one or more sensors is configurable to be associated with one of a plurality of operating field of view volumes, wherein each operating field of view volume represents a space within which the at least one sensor is expected to detect objects outside the autonomous vehicle at a minimum confidence level, and wherein a particular sensor of the at least one sensor is currently associated with a first operating field of view volume of the plurality of operating field of view volumes;
performing a comparison between the sensor data associated with the target object and past sensor data associated with the target object;
selecting, based on the comparison, a second operating field of view volume of the plurality of operating field of view volumes for the particular sensor, wherein the second operating field of view volume is different than the first operating field of view volume; and
adjusting the operating field of view volume of the particular sensor to be the second operating field of view volume.

2. The method of claim 1, wherein the sensor data is associated with the target object during a first environmental condition and the past sensor data is associated with the target object during a second environmental condition.

3. The method of claim 2, wherein the first environmental condition is one or more of a rainy condition, a foggy condition, or a snowy condition, and wherein the second environmental condition is a clear weather condition.

4. The method of claim 2, wherein the first environmental condition is a nighttime condition, and wherein the second environmental condition is a daytime condition.

5. The method of claim 2, wherein the first environmental condition is a first sensor cleanliness condition, and wherein the second environmental condition is a second sensor cleanliness condition.

6. The method of claim 1, wherein performing the comparison between the sensor data associated with the target object and past sensor data associated with the target object comprises:
detecting a degradation in at least one parameter associated with the target object between the sensor data and the past sensor data, wherein selecting the second operating field of view volume is in response to detecting the degradation in the at least one parameter.

7. The method of claim 1, wherein the particular sensor is a camera.

8. The method of claim 1, wherein the particular sensor is a lidar sensor.

9. The method of claim 1, wherein the particular sensor is a radar sensor.

10. A system comprising:
one or more sensors associated with an autonomous vehicle, wherein at least one sensor of the one or more sensors is configurable to be associated with one of a plurality of operating field of view volumes, wherein each operating field of view volume represents a space within which the at least one sensor is expected to detect objects outside the autonomous vehicle at a minimum confidence level, and wherein a particular sensor of the at least one sensor is currently associated with a first operating field of view volume of the plurality of operating field of view volumes;
one or more processors coupled to the one or more sensors;
a memory coupled to the one or more processors, the memory having stored thereon instructions that, upon execution by the one or more processors, cause the one or more processors to perform operations comprising:
receiving, from the one or more sensors, sensor data associated with a target object in an environment of the autonomous vehicle;
performing a comparison between the sensor data associated with the target object and past sensor data associated with the target object;
selecting, based on the comparison, a second operating field of view volume of the plurality of operating field of view volumes for the particular sensor, wherein the second operating field of view volume is different than the first operating field of view volume; and
adjusting the operating field of view volume of the particular sensor to be the second operating field of view volume.

11. The system of claim 10, wherein the sensor data is associated with the target object during a first environmental condition and the past sensor data is associated with the target object during a second environmental condition.

12. The system of claim 11, wherein the first environmental condition is one or more of a rainy condition, a foggy condition, or a snowy condition, and wherein the second environmental condition is a clear weather condition.

13. The system of claim 11, wherein the first environmental condition is a nighttime condition, and wherein the second environmental condition is a daytime condition.

14. The system of claim 11, wherein the first environmental condition is a first sensor cleanliness condition, and wherein the second environmental condition is a second sensor cleanliness condition.

15. The system of claim 10, wherein performing the comparison between the sensor data associated with the target object and past sensor data associated with the target object comprises:
detecting a degradation in at least one parameter associated with the target object between the sensor data and the past sensor data, wherein selecting the second operating field of view volume is in response to detecting the degradation in the at least one parameter.

16. The system of claim 10, wherein the particular sensor is a camera, a lidar sensor, or a radar sensor.

17. A non-transitory computer-readable storage medium, having stored thereon program instructions that, upon execution by one or more processors, cause the one or more processors to perform operations comprising:
receiving, from one or more sensors associated with an autonomous vehicle, sensor data associated with a target object in an environment of the autonomous vehicle, wherein at least one sensor of the one or more sensors is configurable to be associated with one of a plurality of operating field of view volumes, wherein each operating field of view volume represents a space within which the at least one sensor is expected to detect objects outside the autonomous vehicle at a minimum confidence level, and wherein a particular sensor of the at least one sensor is currently associated with a first operating field of view volume of the plurality of operating field of view volumes;
performing a comparison between the sensor data associated with the target object and past sensor data associated with the target object;
selecting, based on the comparison, a second operating field of view volume of the plurality of operating field of view volumes for the particular sensor, wherein the second operating field of view volume is different than the first operating field of view volume; and
adjusting the operating field of view volume of the particular sensor to be the second operating field of view volume.

18. The non-transitory computer-readable storage medium of claim 17, wherein the sensor data is associated with the target object during a first environmental condition and the past sensor data is associated with the target object during a second environmental condition.

19. The non-transitory computer-readable storage medium of claim 17, wherein performing the comparison between the sensor data associated with the target object and past sensor data associated with the target object comprises:
detecting a degradation in at least one parameter associated with the target object between the sensor data and the past sensor data, wherein selecting the second operating field of view volume is in response to detecting the degradation in the at least one parameter.

20. The non-transitory computer-readable storage medium of claim 17, wherein the particular sensor is a camera, a lidar sensor, or a radar sensor.

* * * * *